US011933001B2

(12) United States Patent
Rainwater et al.

(10) Patent No.: US 11,933,001 B2
(45) Date of Patent: *Mar. 19, 2024

(54) SYSTEMS AND METHODS FOR AUTOMATING THE APPLICATION OF FRICTION-MODIFYING COATINGS

(71) Applicant: DeAngelo Contracting Services, LLC, Hazleton, PA (US)

(72) Inventors: Keith Rainwater, Cedar Hill, TX (US); Rick Howorko, Calgary (CA); Matthew Howorko, Edmonton (CA); Jeff Rainwater, Midlothian, TX (US); Jack D. Stone, Jr., Dallas, TX (US); Jim Kirkpatrick, Tiffin, OH (US)

(73) Assignee: DeAngelo Contracting Services, LLC, Hazleton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,375

(22) Filed: Oct. 25, 2022

(65) Prior Publication Data

US 2023/0047596 A1 Feb. 16, 2023

Related U.S. Application Data

(63) Continuation of application No. 17/075,133, filed on Oct. 20, 2020, now abandoned, which is a (Continued)

(51) Int. Cl.

*E01C 23/00* (2006.01)
*B05B 1/04* (2006.01)

(Continued)

(52) U.S. Cl.

CPC .............. *E01C 23/06* (2013.01); *B05B 1/044* (2013.01); *B05B 3/00* (2013.01); *B05B 12/18* (2018.02);

(Continued)

(58) Field of Classification Search

CPC ........ E01C 19/16; E01C 19/17; E01C 19/176; E01C 19/20; E01C 19/201; E01C 19/21;

(Continued)

(56) References Cited

U.S. PATENT DOCUMENTS

| | | | |
|---|---|---|---|
| 1,961,971 | A | 6/1934 | Ignace |
| 1,971,262 | A | 8/1934 | Hendricks |

(Continued)

FOREIGN PATENT DOCUMENTS

| | | | |
|---|---|---|---|
| DE | 1534429 | A1 | 9/1969 |
| DE | 4403243 | A1 | 8/1995 |

(Continued)

*Primary Examiner* — Raymond W Addie

(74) *Attorney, Agent, or Firm* — Jack D. Stone, Jr.; Scheef & Stone, L.L.P.

(57) ABSTRACT

A system and method for the application of friction-modifying coatings to roadways, walkways, pathways and other areas subject to vehicular, human or animal traffic, the system and method comprising the controlled, simultaneous application of binder and filler to a surface of a substrate, using a mobile device which passes over the substrate as the binder and filler are being applied. The system includes a mobile platform configured for being coupled to a vehicle. A binder applicator is mounted on the mobile platform and includes an array of spray nozzles coupled to a resin container. An air knife is mounted on the mobile platform and coupled to an air compressor for generating an air curtain. An aggregate dispenser bar including at least one aggregate dispenser is coupled to an aggregate bin and mounted on the mobile platform for dispensing aggregate.

20 Claims, 14 Drawing Sheets

FIG. 2

Related U.S. Application Data continuation of application No. 16/438,300, filed on Jun. 11, 2019, now Pat. No. 10,808,368, which is a continuation-in-part of application No. 15/944,678, filed on Apr. 3, 2018, now Pat. No. 10,316,478, which is a continuation of application No. 15/432,794, filed on Feb. 14, 2017, now Pat. No. 9,932,715, which is a continuation of application No. 14/835,614, filed on Aug. 25, 2015, now Pat. No. 9,567,716, which is a continuation-in-part of application No. 14/460,543, filed on Aug. 15, 2014, now Pat. No. 9,115,473, which is a continuation of application No. 14/189, 955, filed on Feb. 25, 2014, now Pat. No. 9,109,332.

(51) Int. Cl.

| | |
|---|---|
| ***B05B 3/00*** | (2006.01) |
| ***B05B 12/18*** | (2018.01) |
| ***B05B 13/00*** | (2006.01) |
| ***B05D 1/02*** | (2006.01) |
| ***B05D 5/00*** | (2006.01) |
| ***E01C 19/16*** | (2006.01) |
| ***E01C 19/17*** | (2006.01) |
| ***E01C 19/20*** | (2006.01) |
| ***E01C 19/21*** | (2006.01) |
| ***E01C 23/06*** | (2006.01) |

(52) U.S. Cl.

CPC .............. *B05B 13/005* (2013.01); *B05D 1/02* (2013.01); *B05D 5/00* (2013.01); *E01C 19/16* (2013.01); *E01C 19/17* (2013.01); *E01C 19/176* (2013.01); *E01C 19/20* (2013.01); *E01C 19/201* (2013.01); *E01C 19/21* (2013.01); *E01C 2019/2065* (2013.01)

(58) Field of Classification Search

CPC ..... E01C 23/02; E01C 19/2065; B05B 12/01; B05B 3/00; B05B 13/005; B05D 1/02; B05D 5/00

USPC ...................................... 404/72–75, 108–111

See application file for complete search history.

(56) References Cited

U.S. PATENT DOCUMENTS

| | | | | |
|---|---|---|---|---|
| 2,350,715 | A | 6/1944 | Berg et al. | |
| 3,100,542 | A | 8/1963 | Stark | |
| 3,407,165 | A | 10/1968 | Oepkes et al. | |
| 3,519,169 | A | 7/1970 | Holland | |
| 3,755,226 | A | 8/1973 | Christiansen et al. | |
| 3,807,886 | A | 4/1974 | Cutler | |
| 3,924,048 | A | 12/1975 | Carson | |
| 4,060,425 | A | 11/1977 | Harada et al. | |
| 4,311,274 | A | 1/1982 | Neal | |
| 4,315,700 | A | 2/1982 | Heiligtag et al. | |
| 4,456,633 | A | 6/1984 | Grossi et al. | |
| 4,695,186 | A | 9/1987 | King | |
| 4,775,239 | A | 10/1988 | Martinek et al. | |
| 4,960,242 | A | 10/1990 | Larson | |
| 5,006,012 | A | 4/1991 | Sterner | |
| 5,279,500 | A | 1/1994 | Perrin et al. | |
| 5,294,210 | A | 3/1994 | Lemelson | |
| 5,389,137 | A | 2/1995 | Linde et al. | |
| 5,549,457 | A | 8/1996 | Flores et al. | |
| 5,765,963 | A | 6/1998 | Roberts | |
| 5,895,173 | A | 4/1999 | O'Brien et al. | |
| 5,957,621 | A | 9/1999 | Clark, Jr. et al. | |
| 6,382,523 | B1 | 5/2002 | Hedegard | |
| 6,520,715 | B1 | 2/2003 | Smith | |
| 7,033,106 | B2 | 4/2006 | Harvey | |
| 7,104,724 | B2 | 9/2006 | Terry | |
| 7,118,047 | B1 | 10/2006 | James | |
| 7,448,826 | B2 | 11/2008 | Laury | |
| 7,632,038 | B2 | 12/2009 | Buschmann et al. | |
| 7,802,737 | B2 | 9/2010 | Rayner | |
| 7,854,566 | B2 | 12/2010 | Hall et al. | |
| 8,935,091 | B2 | 1/2015 | Davis | |
| 9,109,332 | B1 | 8/2015 | Stone, Jr. | |
| 9,765,487 | B2 | 9/2017 | Harison, Jr. | |
| 10,808,368 | B2 * | 10/2020 | Rainwater | B05B 1/044 |
| 2003/0012601 | A1 | 1/2003 | Barnat et al. | |
| 2006/0034653 | A1 | 2/2006 | Laury | |
| 2007/0012680 | A1 | 1/2007 | Grisoni | |
| 2010/0210745 | A1 | 8/2010 | McDaniel et al. | |
| 2012/0231259 | A1 | 9/2012 | Weisenberger et al. | |

FOREIGN PATENT DOCUMENTS

| | | | |
|---|---|---|---|
| DE | 200000996 | U1 | 3/2000 |
| FR | 2631992 | A1 | 12/1989 |
| FR | 2661929 | A1 | 11/1991 |
| JP | 08-245924 | A | 9/1996 |
| JP | 2003-278110 | A | 10/2003 |
| JP | 2005-046838 | A | 2/2005 |
| KR | 10-2002-0040518 | A | 5/2002 |
| KR | 10-0589697 | B1 | 6/2006 |
| KR | 10-0713563 | B1 | 5/2007 |
| KR | 10-0760584 | B1 | 9/2007 |
| KR | 10-0804765 | B1 | 2/2008 |
| WO | 2010-030848 | A2 | 3/2010 |

* cited by examiner

Spray Bar (with nozzles) Fully Retracted

Spray Bar (with nozzles) Fully Extended

SYSTEMS AND METHODS FOR AUTOMATING THE APPLICATION OF FRICTION-MODIFYING COATINGS

CROSS-REFERENCE TO RELATED APPLICATIONS

This application is a continuation application of patent application Ser. No. 17/051,133 filed on Oct. 20, 2020, which is a continuation application of U.S. Pat. No. 10,808,368, formerly patent application Ser. No. 16/438,300 filed on Jun. 11, 2019, and issued on Oct. 20, 2020, which is a continuation-in-part application of U.S. Pat. No. 10,316,478, formerly patent application Ser. No. 15/944,678 filed on Apr. 3, 2018, and issued on Jun. 11, 2019, which is a continuation application of U.S. Pat. No. 9,932,715, formerly patent application Ser. No. 15/432,794 filed on Feb. 14, 2017, and issued on Apr. 3, 2018, which is a continuation application of U.S. Pat. No. 9,567,716, formerly patent application Ser. No. 14/835,614 filed on Aug. 25, 2015, and issued on Feb. 14, 2017, which is a continuation-in-part application of U.S. Pat. No. 9,115,473, formerly patent application Ser. No. 14/460,543 filed on Aug. 15, 2014, and issued on Aug. 25, 2015, which is a continuation application of U.S. Pat. No. 9,109,332, formerly patent application Ser. No. 14/189,955, filed on Feb. 25, 2014, and issued on Aug. 18, 2015, which applications are incorporated by reference herein in their entirety.

TECHNICAL FIELD

The present invention relates generally to a system, and associated method, for applying friction-modifying coatings to a surface, and more particularly, for automating the application from a mobile platform of friction-modifying coatings to a surface of a substrate, such as a roadway.

BACKGROUND

The construction and public safety industries are constantly looking for means to make substrates, such as roadways, pathways, and other high-use areas, safer for vehicular and human traffic. One developing area is in the application of friction-modifying coatings to surfaces of substrates to help increase their coefficient of friction, thereby reducing slippage and skidding and making them safer for their intended use. In particular, the roadway industry is trying to reduce the number of accidents caused by loss of tire grip on bridges, curves, intersections, and school zones. Speed, tire condition, and weather conditions can all play a role in these accidents; however, studies have found that increasing the coefficient of friction of the roadway through the use of high friction coatings can increase tire grip, regardless of the weather conditions or nature or condition of the tires.

Currently, few surfaces are being treated with friction-modifying coatings. The surfaces that have been coated are typically being done manually. For example, in the case of a two-component epoxy system, the most common type of binder, the process conventionally starts when a laborer opens the spigot of a tote containing a polymer binder resin, adding it manually to a garbage can or similar container. The spigot is closed when the resin reaches a predetermined level in the garbage can. A second spigot on a second tote containing a catalyst hardener is then opened, adding the hardener to the resin until a second, predetermined level is reached in the garbage can. In some instances, five gallon pails of hardener and resin are combined in the garbage can. The resin and hardener are then mixed, using a mixing blade attached to a hand drill.

The mixed polymer binder is then poured out onto the surface to be coated by tipping the garbage can over or dipping smaller buckets into the garbage can and then pouring the composite polymer binder out of the smaller container onto the surface to be coated. The polymer binder is then spread over the surface, using a squeegee or similar device.

Once the polymer binder is on the surface of the substrate, laborers manually shovel a friction-modifying filler onto the binder. Manually operated blowers and similar instruments have also been used to distribute the friction-modifying filler. The most common filler is bauxite which, once applied, partially sinks into the polymer binder. The epoxy, when it has hardened, acts to bind the filler to the substrate, creating a uniform coating. Because the filler is irregularly shaped, typically jagged and protruding from the polymer binder, it acts to increase the friction coefficient of the surface.

There are a number of drawbacks to the conventional method of application described above. For example, conventional methods utilize a multi-part binder which is manually poured, mixed, and applied to the substrate. Combining the multi-part binder is done using a significant amount of human judgment and imprecise measuring techniques, which introduce error into the component mixing ratios. Most multi-part systems have an ideal ratio of resin and catalyst. Too much of either one of these components can detrimentally affect the properties and performance of the hardened product including, but not limited to, durability, degradation, filler binding, ductility, and frictional properties.

Furthermore, the conventionally practiced method of coating preparation utilizes manual mixing of the components. There is the potential for the components not to be mixed adequately, resulting in pockets of polymer binder wherein the ratio of resin to hardener is not optimal. This variability can ultimately affect the quality of the binder, adhesion to filler, the degree of curing and/or the curing time.

Additionally, if the mixing time of the binder is too long and the binder starts to cure prior to application on the substrate, it may reduce the spread ability and substrate adhesion as well as filler penetration and adhesion.

Furthermore, in the conventional practice of application, the binder is spread on the surface using a squeegee or the like which results in significant variability in the thickness of the binder across the surface of the substrate. As a result, the binder can be too thick in some places and too thin in others. Thick binder can increase drying times and delay the surface availability. Moreover, it can also diminish the integrity of the coating as well as the performance of the coating if the filler is fully enveloped by the binder and does not stick up from its surface. Similarly, binder that is too thin can reduce the integrity and performance of the binder by not providing enough material to hold the filler in place or adhere it to the substrate.

The way the filler is added to the binder can also influence the quality, performance and integrity of the coating. In the conventional method of application when the filler is shoveled or blown onto the surface of the wet binder, it has the tendency to impact the surface of the binder and displace it away from the impact zone. Thus the filler uniformity and overall coating density can vary significantly. In areas with too much filler, the integrity of the coating can be reduced. In areas with too little filler, the frictional properties of the coating can be reduced.

Therefore, what is needed is a system and method for applying friction-modifying coatings to a surface, such as a roadway, without incurring the many drawbacks discussed above.

SUMMARY OF THE INVENTION

The present invention, accordingly, provides a system and method for applying friction-modifying coatings to a surface of a substrate, such as a roadway, using automated equipment mounted on a mobile platform, such as a truck, trailer, cart or the like, to make a simultaneous application of binder and filler to the surface. The mobile platform is preferably driven or pulled across the surface to be coated while the binder and filler are applied to the substrate. Preferably, with respect to the direction of forward movement of the mobile platform, the binder applicator, which binder may comprise a single component or plural components in nature, is positioned forward of the filler applicator, such that the binder gets applied to the substrate and, as the mobile platform moves forward, the filler is then added to the binder. Thus, the time between the application of the binder and the addition of the filler is very short, such as less than a few seconds.

The binder applicator preferably comprises a cylindrical tube capable of being attached to a moving platform. The tube preferably defines at least one cavity within the tube, and each end of the tube is closed. The tube further defines at least one upper opening in an upper portion of the tube, and the at least one upper opening is capable of receiving binder into the cavity. One or more lower openings are defined in a lower portion of the tube, wherein the one or more lower openings preferably collectively extend substantially across the length of the tube and are adapted for dispensing binder from the at least one cavity onto the surface of a substrate. By way of example, the one or more lower openings may assume the shape of a single slot, multiple slots, or multiple circular openings. Multiple slots or openings are preferably arranged in two rows and overlap in an overlap region to facilitate a uniform dispensing of binder to a surface of a substrate.

The systems and methods enable the precise and uniform application of the coating by mechanically controlling and metering both the binder and filler. This ensures good control over coating thickness and binder-to-filler ratios, enabling the coating to be optimized to the surface and desired friction performance. In the case of plural component binders, the method of this invention preferably utilizes inline mixers located immediately before a novel binder applicator to ensure excellent component mixing. The binder applicator, according to principles of the present invention, ensures the uniform application of binder to the substrate. In addition, the binder applicator of the present invention is designed for ease of manufacture.

The systems and methods of this invention have several advantages over conventional means of applying friction-modifying coatings to substrates. For example, the method of this invention has the benefit of decreasing the amount of manual labor required to apply binder and filler to the substrate. The conventional method employs manual labor to mix binder, apply binder to substrate, apply filler, and remove excess filler. Using the method of this invention, the processes of mixing and application of binder and filler are fully automated, thereby reducing the amount of labor required to apply the system to the substrate.

A further advantage of this invention is the increased safety benefit to the workers applying the friction-modifying coating. In roadway application, the friction-modifying coating is generally applied after traffic is blocked off in one or more lanes, using barricades and the like. Although signs and markers are used to divert traffic, laborers still are at risk of being hit by vehicular traffic. In the method of this invention, the mixing and application equipment is preferably mounted on the back of a truck or trailer pulled by a motorized vehicle, reducing the number of people required to openly walk on the roadway, exposed to traffic.

A further benefit of this invention is an increase in the application rate of the friction-modifying coating. The conventional method of application results in an application rate of approximately 1,000 square yards per day. Using the systems and methods of this invention, the application rate can be increased to over 10,000 square yards per day, although conventional rates of application are possible if desired. This will have the benefit of decreasing the amount of time required to complete a project as well as a reduction in the disruption of the traffic, due to closure of the surface being coated.

A further benefit of this invention is a reduction in the time that transpires from the time the binder is applied to the substrate and the time the filler is added to the binder. For the previous methods of application, several minutes can pass before the filler is added to the binder. This is the result of the time required to mix and then manually apply the binder and then the filler to the binder. The method of this invention results in the filler being added almost immediately to the binder in sequence and in virtually a one-step process. The lapsed time between application of the binder and addition of the filler should be short, preferably less than 5 seconds. This results in greater filler penetration and a more durable coating.

Another benefit of this invention is the uniformity of the friction-modifying coating and filler within the composition. Under the conventional methods of application, the filler is added to the binder either by manually shoveling it, or through the use of a manually operated blower. Both of these conventional methods result in variability in the filler density per square foot of substrate surface, and patches containing too much filler and others not containing enough filler. The method of the present invention results in the uniform application of filler across the width and length of the surface being coated. Thus, there is high uniformity of filler density per square foot, and the filler density can be controlled at an optimal value to ensure a desired friction coefficient with the least amount of filler. The correct filler density also has the added benefit of ensuring the best ratio of filler and binder to produce the greatest coating strength, integrity, and durability.

In the case of multi-component binders, the method of the present invention has the benefit of enabling accurate metering and control over the component ratio, excellent component mixing, and rapid application after the components are mixed. The use of automated flow controls ensure the desired component flow ratios, and the use of inline mixers located proximate to application ensure good mixing of components. The short duration of time from mixing until application, has the benefit of ensuring that the mixed binder is applied quickly at the ideal curing point and temperature, which in turn will ensure excellent filler penetration, substrate adhesion, and coating uniformity.

Still another benefit of this invention is reducing costs of repairs. The non-uniformity of the conventional methods as discussed above resulted in sections of coated substrate with a sub-par coating. Some of these sections lacked sufficient friction-modifying properties due to a lack of filler being applied. Other sections lost their friction-modifying properties sooner than anticipated because not enough binder had been applied. These issues resulted in costly repairs to re-coat the substrate. The present invention provides increased uniformity in the application of binder and filler, thus reducing cost associated with re-coating.

The designs of various components used in the systems and methods of the present invention are also optimized for ease of manufacture, thereby further reducing costs associated with practicing the systems and methods of the present invention. For example, the binder applicator described herein employs a novel and cost-effective design that reduces the amount of labor associated with laser-drilling the component.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
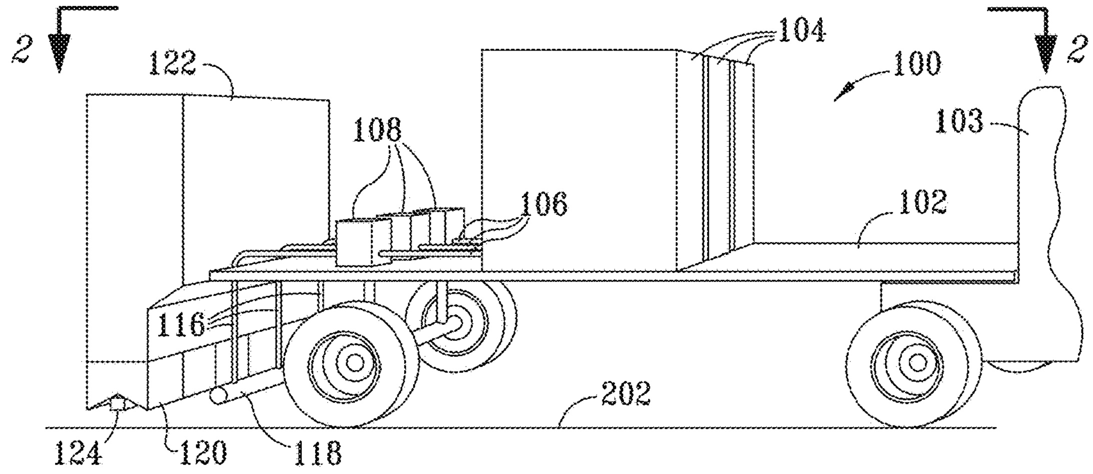
FIG. 1 is a perspective view of a system for automating the application of friction-modifying coatings from a mobile platform, in accordance with principles of the present invention.

The invention relates to the controlled preparation and application of friction-modifying coatings, comprising a binder and filler, to surfaces subject to vehicular, human, and/or animal traffic. Friction-modifying coatings are applied to areas where the friction coefficient of the surface needs to be increased in order to reduce skidding or slipping, making it safer and/or better for its intended purpose. Included in the many substrate surfaces which can benefit from the application of these coatings are pathways, walkways, highways and roadways, bridge decks, parking lots, school zones, road crossings, railway crossings, dangerous intersections, bike lanes, toll lanes, sharp corners, intersections, overpasses, hospital zones, playgrounds, gymnasiums, and the like.

In the discussion of the FIGURES, the same reference numerals will generally be used throughout to refer to the same or similar components. In the interest of conciseness, various components known to the art, such as metering devices, pumps, positive displacement pumps, screw pumps, extruders, valves, control valves, orifices, flow controllers, nozzles, spray nozzles, extruders, brushes, jets, impellers, blowers, rollers, orifices, pipes, tubes, knives, ribboners, motorized mixers, mixing screws, paddles, impellers, propellers, in-line mixers, static mixers, minerals, rocks, metals, metal oxides, hydrates, hydroxides, salts, silicates, epoxy hardener and resin, and the like, have not been shown or discussed in any detail as such are considered to be well-known to persons having ordinary skill in the art.

Referring to FIG. 1 of the drawings, the reference numeral 100 generally designates a multi-part coating system embodying features of the present invention. The system 100 includes a mobile platform 102 coupled to a truck tractor 103 (shown only in part) adapted for pulling the mobile platform 102 on the surface of a substrate 202 whose properties are to be modified. In alternative embodiments of the invention, the mobile platform 102 coupled to a truck tractor 103 may be replaced with a truck. The truck or truck tractor 103 is preferably adapted for pulling the mobile platform over the substrate 202 at between about 0.1 and 5 miles per hour, although speeds of up to 30 miles per hour or even faster could be used in certain applications. As discussed further below, in operation, the mobile platform 100 travels over the surface of the substrate 202 to be coated and applies a coating to the substrate as it moves forward. The mobile platform 100 is typically between about 1 and 30 feet wide, and preferably between about 8 and 12 feet wide.

One or more storage vessels or containers 104 are positioned on the platform 102 for containing various binder components, discussed in further detail below. The storage containers 104 may be operated at atmospheric or elevated pressure. Further, the storage containers 104 are coupled via lines 106, one or more metering devices 108, and lines 116 to a binder applicator 118. The metering devices 108 may include pumps (e.g., positive displacement pumps, screw pumps, and the like), extruders, valves, control valves, orifices, flow controllers and/or the like, or a combination thereof, well-known to those skilled in the art, for conveying or metering components contained within the containers 104.

A hopper 122 is preferably also positioned on the mobile platform 102 for storing filler to be added to the binder, as discussed in further detail below. Preferably, one or more flow zones and/or zone flow controllers 120 are coupled to the hopper, rearward of the binder applicator 118, for metering filler to be applied onto the binder. A distributor 124 is preferably positioned under the controllers 120 for facilitating an even distribution of filler onto the binder.

Figure 2:
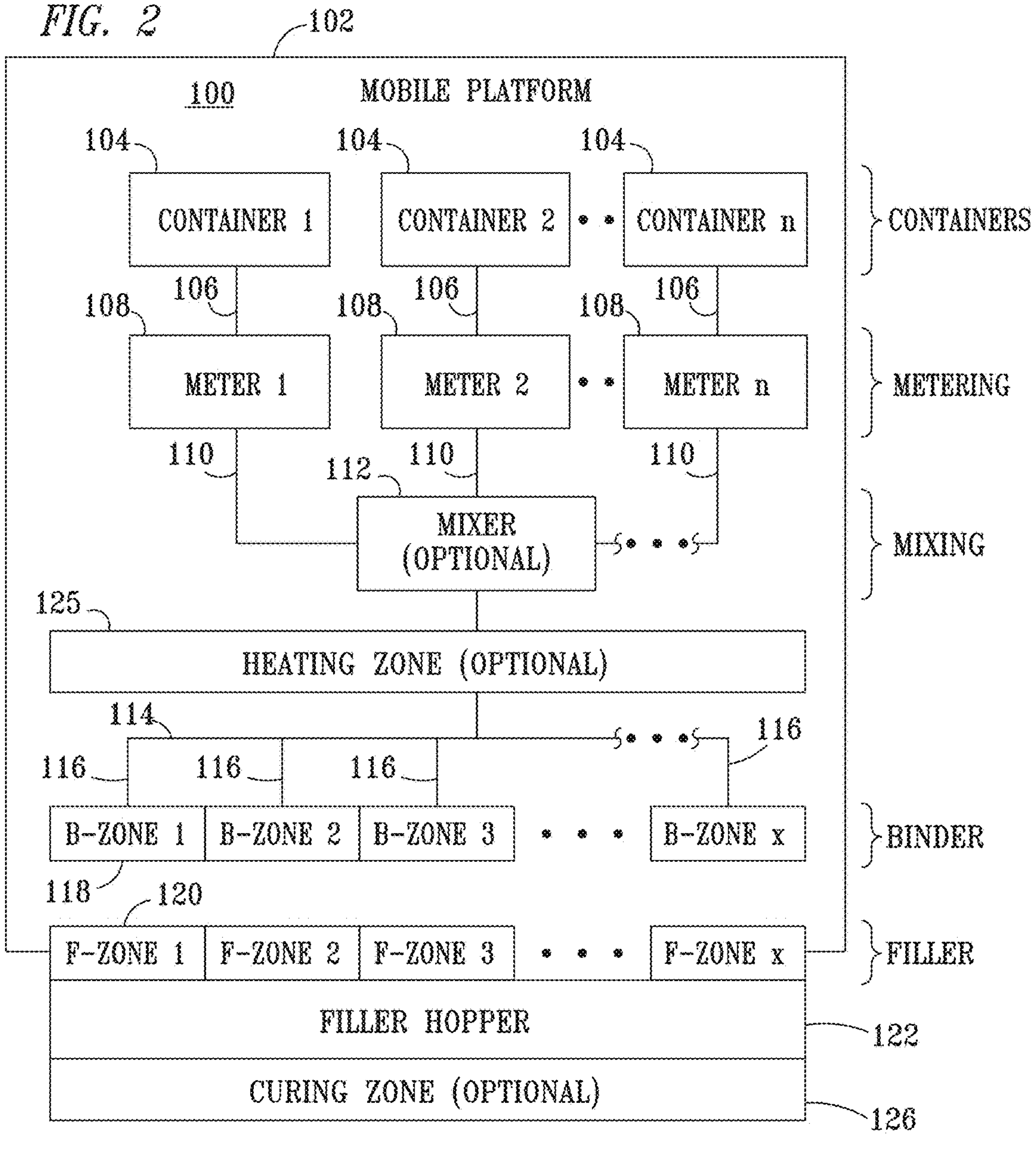
FIG. 2 is a schematic top view taken along the line 2-2 of FIG. 1, exemplifying a mobile platform embodying features of the present invention.

FIG. 2 is a schematic top view of the mobile platform 102, taken along the line 2-2 of FIG. 1. In addition to the elements of the invention set forth in FIG. 1, FIG. 2 depicts optional elements, such as an optional mixer 112 coupled to the meters 108 via lines 110. The mixer 112 is adapted for mixing the components stored in containers 104 pumped from the meters 108, although mixing can alternatively occur directly in lines 114 and 116 (e.g., inline mixers) if the mixer 112 is not present.

The binder applicator 118 may comprise multiple binder zones (e.g., B-ZONE 1 to B-ZONE x). Each binder zone preferably has at least one line 116 associated with it, which allows binder zones to be individually turned-on or turned-off. The number of hopper flow control zones 120 (e.g., F-ZONE 1 to F-ZONE x) preferably corresponds in number to the number of binder zones 118. In an alternative embodiment of the invention, depicted in FIG. 3, the binder applicator 118 consists of a single binder zone, and similarly, there is but a single hopper flow control zone 120.

Figure 3:
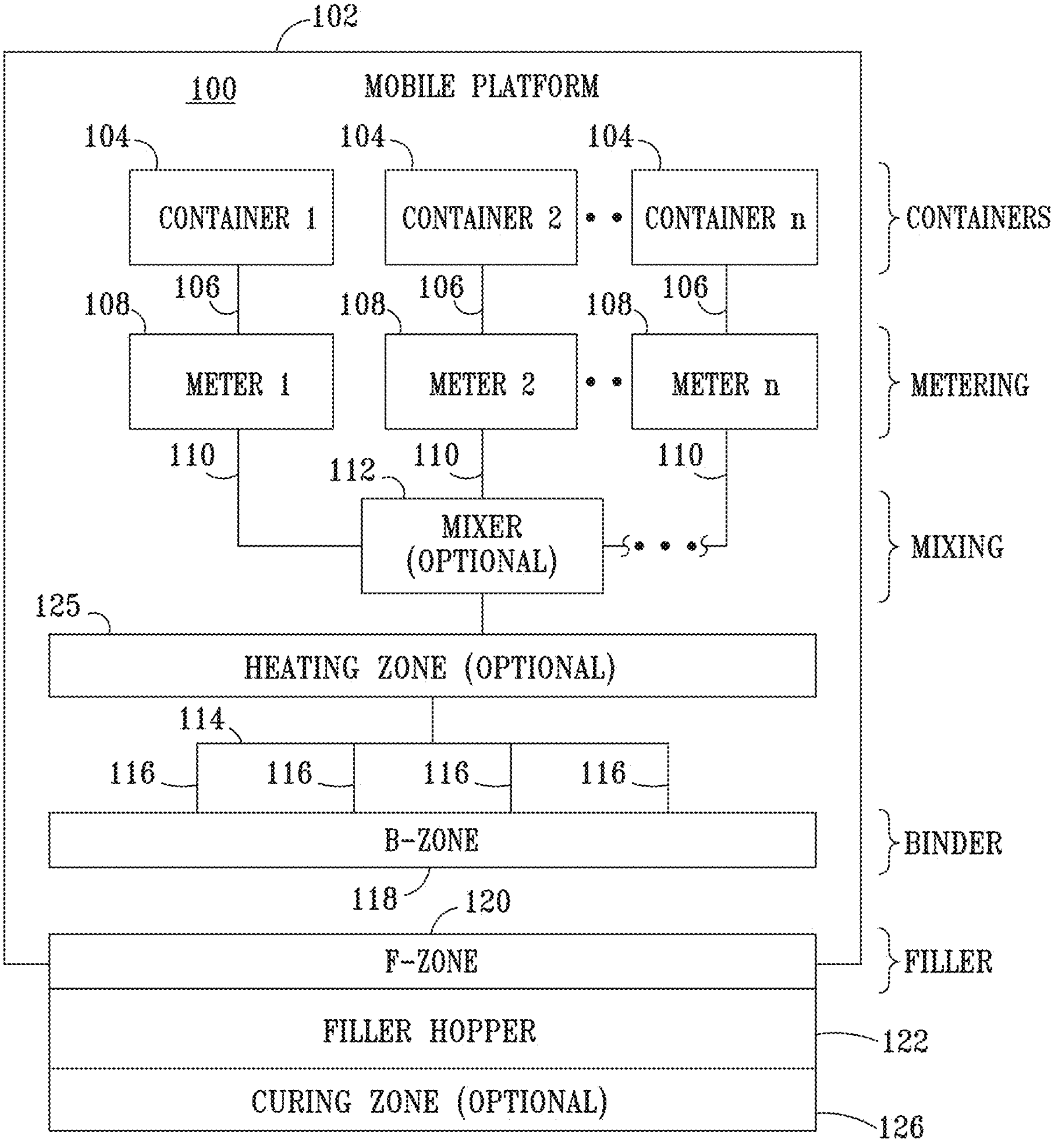
FIG. 3 is a schematic view exemplifying an alternate embodiment of a mobile platform embodying features of the present invention.

With reference to both FIGS. 2 and 3, in a preferred embodiment of the invention, a portion of the surface of the substrate 202 is designated as a heating zone 125 which is heated or dried, prior to application of the binder, using any suitable technique, such as hot air, radiation, ultraviolet (UV) light, infrared (IR) light, microwaves, or the like, to prepare the surface of the substrate and facilitate adhesion of the binder to the surface.

In addition to a heating zone 125, there is preferably also a curing zone 126 optionally identified proximate to the hopper flow control zones 120. Preferably positioned proximate to the curing zone would be equipment or means for expediting or facilitating binder curing, including equipment for blowing air onto the binder, or applying to the binder radiation, such as IR light, UV light, heat, microwaves, and/or the like.

The systems and methods of the invention comprise the use of a multi-part coating system, preferably comprising a binder and a filler embedded in the binder. The binder acts as a matrix to suspend and hold the filler in place and causes it to adhere to the surface of the substrate. The filler acts to change the friction coefficient of the surface by protruding from the binder or otherwise increasing the overall coefficient of friction. Thus, the systems and methods of the invention apply binder and filler to surfaces of a substrate (e.g., roads, highways, and the like) subject to traffic, thereby modifying the frictional properties of the surfaces.

According to a preferred method of the invention, the filler and binder are metered and applied to the substrate 202 in an automated, continuous, virtually one-step process that results in better coating integrity, uniformity, durability, and reduced application time. The binder is preferably a single or plural component binder that is preferably stored in one or more storage vessels or containers 104 on the mobile platform 102. In the case of a single component binder that is solid at ambient conditions, heat may optionally be added to storage containers 104 and/or lines 106 to liquefy the binder and enable it to be more readily transferred through lines, piping, or the like. The flow of the binder is precisely metered using metering devices 108, such as positive pumps, displacement pumps, screw pumps, extruders, valves, control valves, orifices, or the like, or a combination thereof.

For multi-component binders, the various components are preferably mixed by way of a mixer 112, and are then passed via lines 114 and 116 to the binder applicator 118. Alternatively, multi-component binders may be mixed in lines 114 and 116, for example, using an inline mixer (not shown). For single component binders, the mixer 112 is not needed, and the binder preferably flows directly to the binder applicator 118.

As discussed in further detail below with respect to FIGS. 4-16, the binder applicator 118 spreads out the binder across the width of the surface to be coated and deposits a uniform layer of binder across the desired width. The binder applicator 118 may have one or more binder zones (B-ZONE 1 to B-ZONE X). Each binder zone preferably has at least one line 116 associated with it. This allows an operator to individually turn-on or turn-off a particular binder zone. Thus, the width of the substrate being coated can be controlled by the number of binder zones (B-ZONE 1 to B-ZONE X) that are activated.

Within a short time, preferably less than five seconds, of application of the binder to the substrate 202 (FIG. 1), the filler contained in hopper 122 is metered through zone flow controllers 120 (F-ZONE 1 to F-ZONE x) and applied onto the binder. The number of hopper flow control zones is preferably the same as the number of binder zones. The width of application is controlled by controlling the number of binder zones (B-ZONE 1 to B-ZONE x) and filler zones (F-ZONES) used. Additional conveyers (not shown) may be used to more uniformly distribute the filler across the width of the binder. Following application of the binder, and either before or after the application of filler, accelerators such as UV or IR radiation, heat, microwaves, and/or the like, may be used to facilitate or accelerate the curing of the binder.

For plural component binders, the binder first flows through lines 110 to one or more mixers 112, through the lines 114 and 116, and then through the binder applicator 118. The one or more mixers 112 preferably comprise contained motorized mixers, mixing screws, paddles, impellers, propellers, in-line mixers, static mixers, and/or the like, effective for uniformly mixing a plurality of components. The binder then flows to the binder applicator 118 proximate to B-ZONE 1 to B-ZONE x. The filler is preferably applied as discussed above after the binder has been applied to the substrate 202.

In one alternative embodiment of the invention, the filler and binder are mixed prior to application and then applied at the same time. In accordance with this embodiment, the filler and binder are metered into a mixing zone comprising a section, such as a vessel, tank, channel, pipe, box, or other suitable means effective for creating contact between a plurality of components prior to application on the substrate. A mixing device such as a paddle, blade, impeller, propeller, screw, conveyor, tumbler or the like, effective for mixing a plurality of components, may be used to mix the filler and binder.

The binder can be a one or multiple part system, comprising one or more of polymers, elastomers, thermoplastics, thermosets, or the like, including vulcanized rubbers, Bakelites, urea-formaldehydes, melamine resins, epoxy resins, polyamides, plastics, peroxides, silanes, cross-linked metallic compounds, isocyanates, resins, polyethylenes, polypropylenes, polystyrene, polymethylmethacrylate, vinyls, Polybutylene terephthalates, polyureas, polycarbonates, Polyethylene terephthalates, Acrylonitrile butadiene styrene (ABS) acrylics, celluloids, cellulose acetates, ethylene-vinyl acetates, ethylene vinyl alcohols, fluoroplastics, ionomers, Kydex, liquid crystal polymers, polyacetals, polyacrylates, Polyacrylonitriles, polyamides, Polyamide-imides, polyaryletherketones, polybutadienes, polybutylenes, Polybutylenes terephthalates, polycaprolactones, polychlorotrifluoroethylenes, natural rubbers, synthetic polyisoprenes, butyl rubbers, halogenated butyl rubbers, polybutadienes, styrene-butadiene rubbers, polybutadiene, nitrile rubber, hydrogenated nitrile rubbers, polychloroprenes, ethylene propylene rubbers, ethylene propylene diene rubbers, epichlorohydrin rubbers, polyacrylic rubbers, silicone rubbers, fluorosilicone rubbers, fluoroelastomers, Vitons, Tecnoflons, fluorels, aflas, Dai-Els, perfluoroelastomers, tecnoflon PFR, Kalrez, Chemraz, Perlast, polyether Block Amides, chlorosulfonated Polyethylenes, ethylene-vinyl acetates, thermoplastic elastomers, thermoplastic vulcanizates, thermoplastic polyurethane, thermoplastic olefins, polysulfide rubbers, polyethylene terephthalates, polycyclohexylene dimethylene terephthalates, polycarbonates, polyhydroxyalkanoates, polyketones, polyesters, polyethylenes, polyetheretherketones, polyetherimides, polyethersulfone, polysulfones, polyethylenechlorinates, polyimides, polylactic acids, polymethylpentenes, polyphenylene oxides, polyphenylene sulfides, plyphthalamides, polypropylenes, polystyrenes, polysulfones, polyurethanes, polyvinyl acetates, polyvinyl chlorides, polyvinylidene chlorides, spectralon, styrene-acrylonitrile and/or the like. Various additives such as viscosity modifiers, catalysts, accelerators, UV protectors, inhibitors, anti-oxidants, repellants, oils, and the like, can be added to the binder to change its physical or chemical properties to enhance characteristics such as pumpability, spreadability, curing rate, cured binder properties, ductility, motility, hardness, adhesion cohesion sprayability, extrudability, durability, wear rate, applyability, oxidative stability, thermal stability, UV stability, and the like.

It is preferable that the binder, once applied and cured, be solid or semi-solid at the normal, or ambient, operating conditions of the substrate. The binder is preferably applied as a liquid which then solidifies once it is applied to the substrate; however, it is possible to apply solids such as powders, pellets, or the like, directly to the substrate and subsequently melt, react, or dissolve them to form a uniform coating. In the case of a liquid binder, the binder is applied as a liquid which cures and hardens after application to the substrate through chemical or physical changes, such as cross-linking, curing or solidification, and/or the like. For example, if a thermo-plastic is used as the binder, the thermoplastic may be heated above its melting point, prior to its application to the substrate, until it becomes a fluid. Thereafter, the fluid cools to a uniform solid. If a multi-component liquid binder is used, then the liquid parts are preferably combined prior to application and cured into a solid. Heating may be used depending on the binder to change the physical properties of the binder to enhance pumping and/or ease of application. Optionally, a liquid binder may be applied to the substrate, and radiation, heat, microwaves, light, and/or the like, may be used to cure the binder.

The binder applicator 118 preferably applies the binder to the substrate by pouring, dripping, spraying, rolling, brushing, extruding, wiping, squeegeeing, ribboning, baring, and/or the like.

The filler is preferably added to the binder prior to hardening or curing in a metered fashion at a rate calculated to attain a desired density and respective coating frictional properties. The filler preferably comprises one or more minerals, rocks, metals, metal oxides, hydrates, hydroxides, salts, silicates, plastics, polymers, glasses, halides, sulfides, phosphates, carbonates, carbon, oxides, ores, and/or the like. The filler is preferably applied to the binder through a hopper or similar device which temporarily stores the filler. Application of the filler to the binder preferably occurs through a drop or rotary spreader, blower, conveyor, screw, or similar material transfer device.

Other fillers, catalysts, or performance-enhancing materials can also be added to the binder to enhance the properties of the friction-modifying coating. By way of example, but not limitation, fillers, catalysts, or performance-enhancing materials may include catalysts, compatabilizers, ultraviolet stabilizers, thermal stabilizers, oxidative stabilizers, chemical stabilizers, wear resistance modifiers, reflectivity enhancers, water repellants, oil repellants, ice repellants, co-polymers, rubbers, pigments, and/or the like, effective for changing the properties or performance of the coating.

The application of the binder and filler are preferably mechanically linked in close proximity to each other on a mobile platform 202, such as a truck or trailer, which passes over the substrate to be coated. However, in an alternative embodiment, the binder can be applied from one mobile platform and the filler can be applied from another mobile platform. As the mobile platform(s) moves forward, the binder is precisely metered and applied to the substrate 202. Within a short period of time, because the platform(s) is (are) moving forward, the filler is metered and precisely added on top of the binder. Both the binder and filler are added in proportion to the speed of the mobile platform(s) to ensure the proper application thickness and proportions of filler and binder. Once the binder has hardened, the excess filler is collected and reused.

The preferred binder is a two part epoxy comprising a catalyst (hardener) and a resin. The hardener and resin are stored in storage vessels or containers 104 on the mobile platform 100. Each part of the epoxy, individually, is preferably filtered and then conveyed using positive displacement pumps on meters 108, or similar means of material transfer and control, to one large static mixer, or preferably a series of smaller static mixers, located in close proximity to a binder applicator 118. Alternatively, inline mixers (not shown) may be located in lines 116. The ratio of the two parts of the epoxy is precisely controlled by adjusting the ratio of the flow or hardener to the flow of resin using a hardener pump and/or resin pump. The ratio of resin to hardener differs with the epoxy system, but conventionally varies from approximately 5 parts resin and 1 part hardener to 1 part resin and 5 parts hardener. In one preferred embodiment, an approximate ratio of 1 part resin to 1 part hardener is used.

In the preferred embodiment of the invention, the application rate of the binder is adjusted to produce a thickness of between about 1 mil and 500 mils, and preferably between 40 and 80 mils. The desired application thickness is determined by the substrate 202 properties, surface, climate, filler properties, desired frictional properties, and/or the like. Using the method of this invention, the thickness can be precisely controlled by varying the speed of the mobile platform 100 and the total flow rate of the binder.

In the preferred embodiment of the invention, a series of between 1 and 20 inline mixers, preferably helical static mixers, are used to combine and uniformly mix the two parts of the epoxy, although other mixer types can also be used. Preferably, the number of inline mixers corresponds to the number of binder zones (B-ZONES); however, it is possible to use one mixer and then feed each of the binder zones from the one mixer. The inline mixers are designed to ensure thorough mixing of the hardener and resin prior to application through the binder applicator 118.

Figure 4:
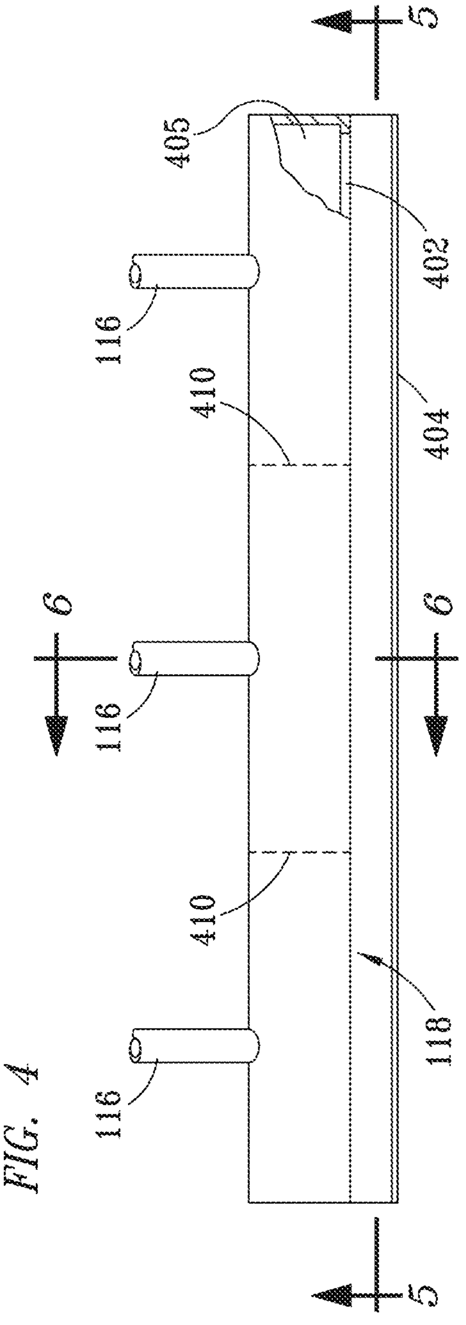
FIG. 4 is a front view of a first embodiment of a binder applicator in accordance with principles of the present invention.
Figure 5:
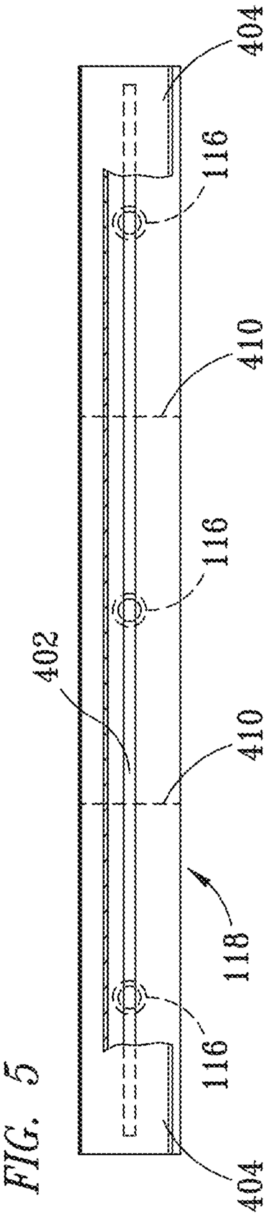
FIG. 5 is a bottom view of the binder applicator in FIG. 4 taken along section line 5-5 of FIG. 4.
Figure 6:
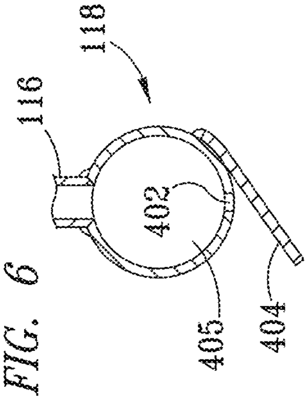
FIG. 6 is a cross-sectional view of the binder applicator in FIG. 4 taken along section line 6-6 of FIG. 4.

Turning now to the binder applicator 118 in particular, a first preferred embodiment of the binder applicator is shown in FIGS. 4-6. As shown in FIG. 4, the binder applicator 118 preferably comprises a cylindrical tube, such as a pipe, within which is defined a hollow cavity 405. Binder applicator 118 is preferably fabricated from a material such as polyvinyl chloride ("PVC"), or alternatively, from any material that can be drilled, tapped, and slit, such as copper, steel, aluminum, or the like. The inside diameter of hollow cavity 405 depends on the pressure and flow rate of binder, but in one preferred embodiment, the inside diameter of hollow cavity 405 is about one inch. Optionally, the binder applicator 118 has one or more zone partitions 410 that define two or more binder zones, as also exemplified by FIG. 2. Lines 116 connect the binder applicator 118 to the upstream components (e.g., storage vessels or containers, metering devices, and mixers). Preferably there will be at least one line 116 for each binder zone present. While not required, in a preferred embodiment, an applicator apron 404, comprising a plate shown most clearly in FIG. 6, is attached to the binder applicator 118 to further regulate the uniformity and thickness of binder deposited onto the substrate 202. The plate constituting the applicator apron 404 is preferably flat, as shown, but may also be curved, and is preferably fabricated from a flexible material, such as vinyl, flexible PVC, or the like.

FIG. 5 shows a bottom view of the binder applicator 118 shown in FIG. 4. One or more elongated co-linear openings or slots (also referred to as slits) 402 are formed in the bottom of the binder applicator 118. Each slot 402 corresponds to a separate binder zone. The binder applicator 118 is preferably 8 to 12 feet long, although it may be shorter or longer. The length of the openings or slots 402, collectively, is preferably at least 90% of the length of the binder applicator 118. The width of the slots 402 is suitably sized for facilitating a desired or optimal binder flow rate and, by way of example but not limitation, in one preferred embodiment, the width is about one eighth of an inch. The slots 402 may be formed in any suitable manner, such as by way of laser in a single pass while still permitting an optimal binder flow rate.

FIG. 6 shows a cross-sectional view of the binder applicator 118 taken along section line 5-5 in FIG. 4. Preferably, the binder applicator 118 is roughly cylindrical with a diameter between one and six inches. However, in other embodiments, the binder applicator 118 can be of another shape (e.g., hexagonal, square, or rectangular when viewed from the side). Line 116 is connected to the upper portion of binder applicator 118. Opening or slot 402 is formed in the lower portion of the binder applicator 118. The applicator apron 404 is preferably attached (e.g., by welding) as shown to the binder applicator 118 behind the slot 402.

According to a preferred method and operation of binder applicator 118 of FIGS. 4-6, binder enters the binder applicator 118 via lines 116. Binder fills the cavities 405 and is then dispensed through slot 402 preferably onto the applicator apron 404. The applicator apron 404 further regulates the uniformity and thickness of binder, which is then dispensed onto the surface of the substrate 202. As shown in the embodiment of FIG. 4, the binder applicator 118 has three binder zones corresponding to the three cavities 405 fed by corresponding lines 116. Each line 116, and hence each binder zone, may be individually controlled, e.g., by a switch or valve (not shown). Thus, the width of the surface of the substrate coated may be controlled.

Figure 7:
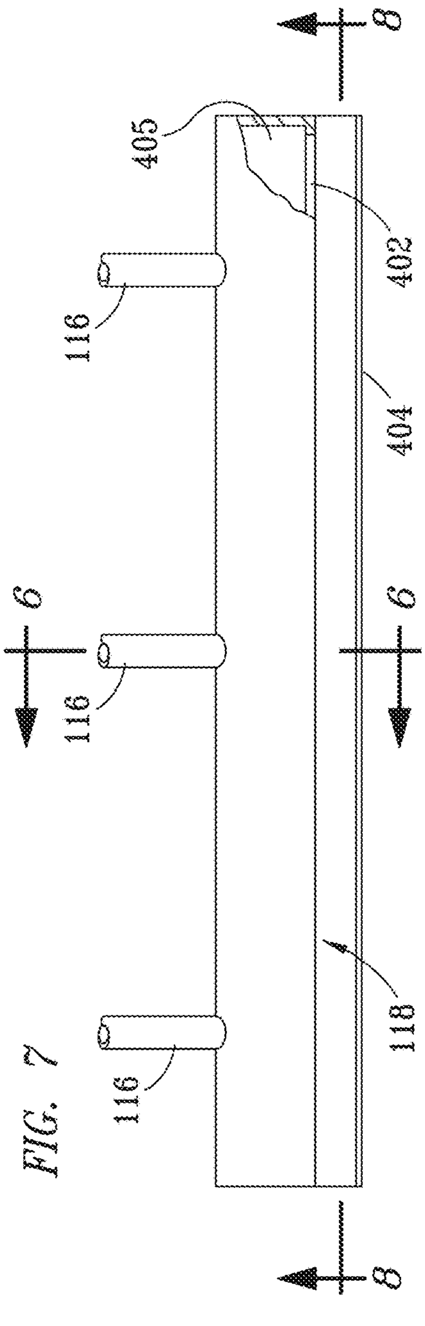
FIG. 7 is a front view of a second embodiment of a binder applicator in accordance with principles of the present invention.
Figure 8:
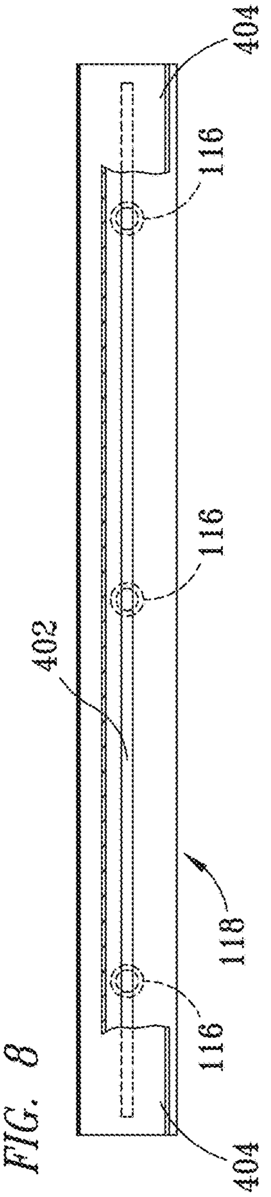
FIG. 8 is a bottom view of the binder applicator shown in FIG. 7 taken along section line 8-8 of FIG. 7.

A second preferred embodiment of the binder applicator 118 is shown in FIGS. 7-8. In this embodiment, the zone partitions 410 (see FIG. 4) are omitted. A single hollow cavity 405 is formed inside the binder applicator 118. A single slot 402 is formed extending substantially along the length of the binder applicator 118. The slot 402 corresponds to a single binder zone, as exemplified by FIG. 3. The applicator apron 404 is preferably attached to the binder applicator 118 as in the embodiment of FIGS. 4-6.

According to a preferred method and operation of binder applicator 118 of FIGS. 7-8, binder enters the binder applicator 118 via lines 116. Binder fills the cavity 405 and is then dispensed through slot 402 preferably onto the applicator apron 404. The applicator apron 404 further regulates the uniformity and thickness of binder, which is then dispensed onto the surface of the substrate 202.

Figure 10:
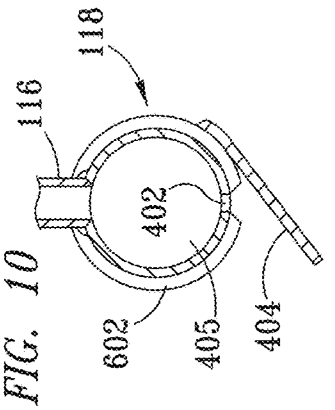
FIG. 10 is a cross-sectional view of the binder applicator in FIG. 9 taken along section line 10-10 of FIG. 9.
Figure 9:
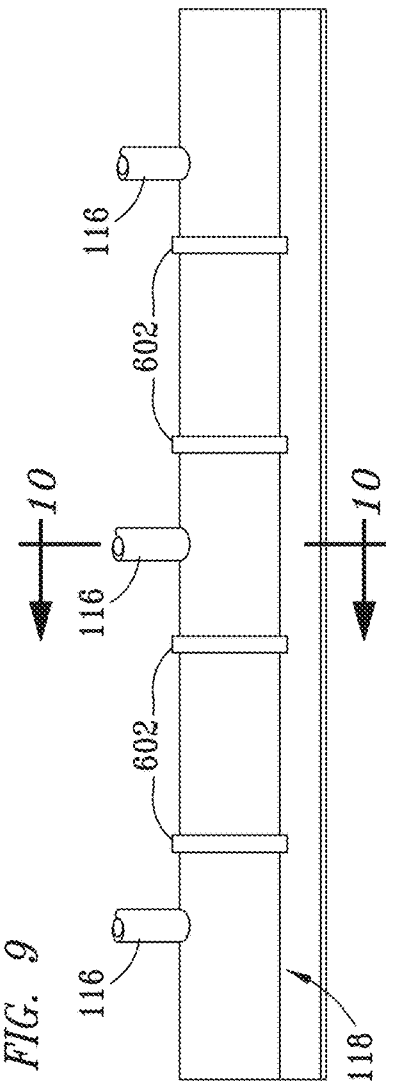
FIG. 9 is a front view of a third embodiment of a binder applicator in accordance with principles of the present invention.

In a third preferred embodiment of the binder applicator 118, exemplified by FIGS. 9 and 10, flanges 602 are attached to the binder applicator 118. The flanges 602 provide additional structural support to the walls of the binder applicator 118 against the forces applied by the binder, which in some embodiments is pumped into the cavity (or cavities) 405 at high pressure. Such forces over time may distort the shape of the slots 402 and cavity (or cavities) 405, particularly when zone partitions 410 are omitted. The flanges 602 prevent such distortion and allow the binder applicator 118 to perform optimally for years. The applicator apron 404 is preferably attached to the binder applicator 118 as in the embodiments of FIGS. 4-8.

According to a preferred method and operation of binder applicator 118 of FIGS. 9-10, binder enters the binder applicator 118 via lines 116. Binder fills the cavity 405 and is then dispensed through slot 402 preferably onto the applicator apron 404. The applicator apron 404 further regulates the uniformity and thickness of binder, which is then dispensed onto the surface of the substrate 202.

Figure 13:
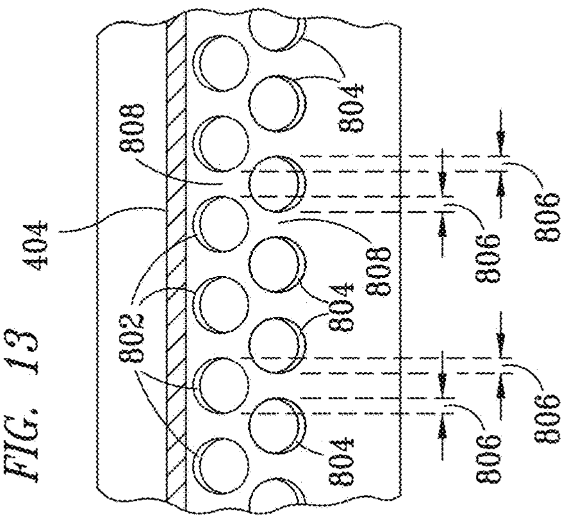
FIG. 13 is a partial view of the binder applicator in FIG. 12 taken within view line 13 of FIG. 12.
Figure 11:
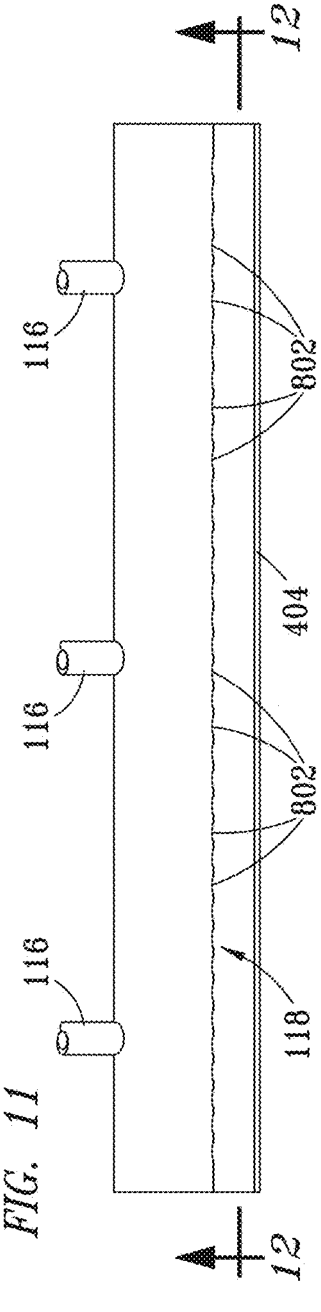
FIG. 11 is a front view of a fourth embodiment of a binder applicator in accordance with principles of the present invention.
Figure 12:
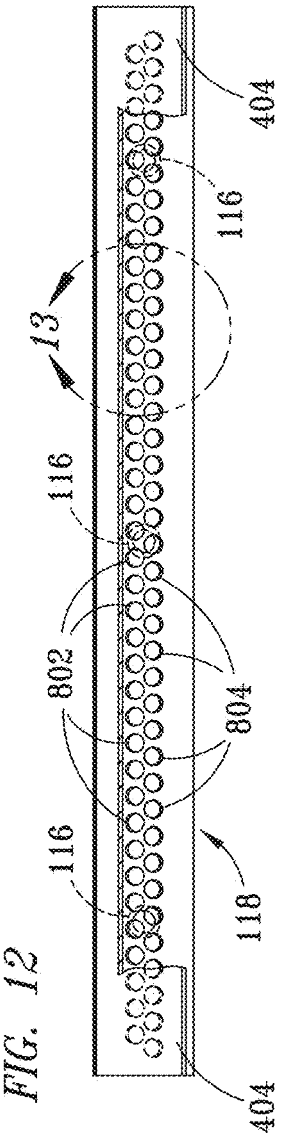
FIG. 12 is a bottom view of the binder applicator in FIG. 11 taken along section line 12-12 of FIG. 11.

In a fourth preferred embodiment of the binder applicator 118, depicted by FIGS. 11-13, lines 116 are coupled to binder applicator 118. A plurality of openings 802 and 804 are formed in the lower portion of binder applicator 118. Optionally, zone partitions 410 (e.g., FIG. 4) may be utilized, and the applicator apron 404 is preferably attached to the binder applicator 118 as in the embodiments of FIGS. 4-10.

A bottom view of binder applicator 118 of FIG. 11 is shown in FIG. 12. In this embodiment, the opening or slot 402 (e.g., FIGS. 5 and 8) are replaced with openings 802 and 804, which are preferably generally circular in shape, having a diameter suitable for a desired or optimal binder flow rate and ease of manufacture and maintenance. The openings 802 and 804 are linearly arranged into two rows along the length of the binder applicator 118 as shown in FIG. 12.

As shown in FIG. 13 (a partial view along section line 13), each opening 802 is offset from a corresponding opening

804, thus forming an overlap region 806. The overlap region 806 is sized to provide increased uniformity when binder is dispensed. Preferably, the width of each overlap region 806 is approximately 10-40% of the diameter of each opening.

In alternate embodiments, the number of rows used may vary, from a single row of openings to three or more rows of openings. The size and number of the openings 802 and 804 may vary to obtain the desired binder flow-rate properties.

The openings 802 and 804 permit binder to be dispensed on the surface of the substrate in a substantially uniform manner similar to the slot 402 (FIGS. 5 and 8). But, because more structural material 808 of the binder applicator 118 remains along the bottom of the applicator after forming the openings 802 and 804 than remains with slot 402 of the embodiments of FIGS. 5 and 8, there is more structural integrity to the binder applicator 118. As such, flanges 602 are preferably not used.

According to a preferred method and operation of binder applicator 118 of FIGS. 11-13, binder enters the binder applicator 118 via lines 116. Binder fills the cavity 405 and is then dispensed through slot 402 preferably onto the applicator apron 404. The applicator apron 404 further regulates the uniformity and thickness of binder, which is then dispensed onto the surface of the substrate 202.

Figure 14:
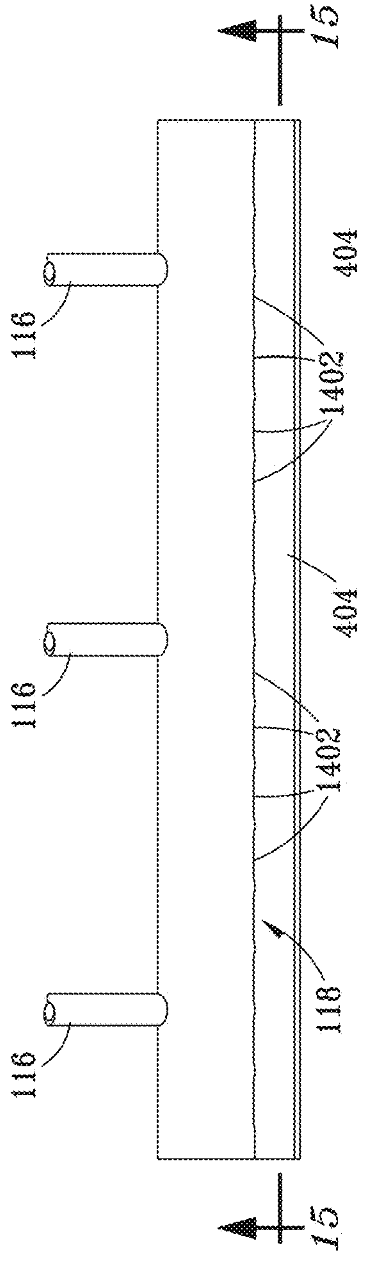
FIG. 14 is a front view of a fourth embodiment of a binder applicator in accordance with principles of the present invention.
Figure 15:
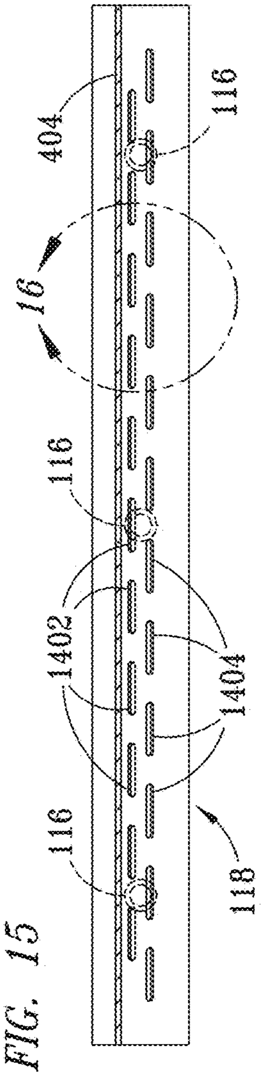
FIG. 15 is a bottom view of the binder applicator in FIG. 14 taken along section line 15-15 of FIG. 14.
Figure 16:
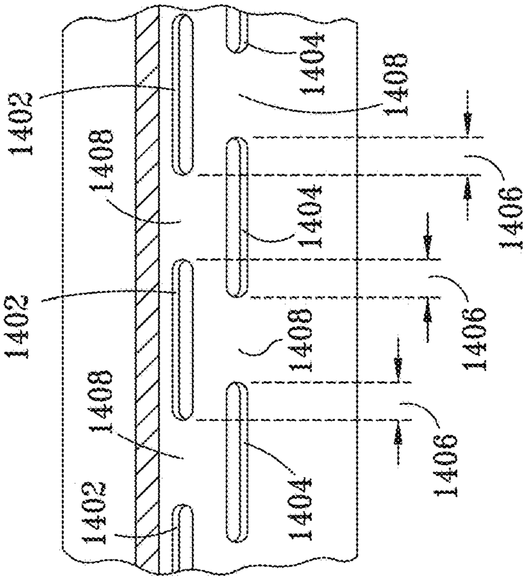
FIG. 16 is a partial view of the binder applicator in FIG. 15 taken within view line 16 of FIG. 15.
Figure 17:
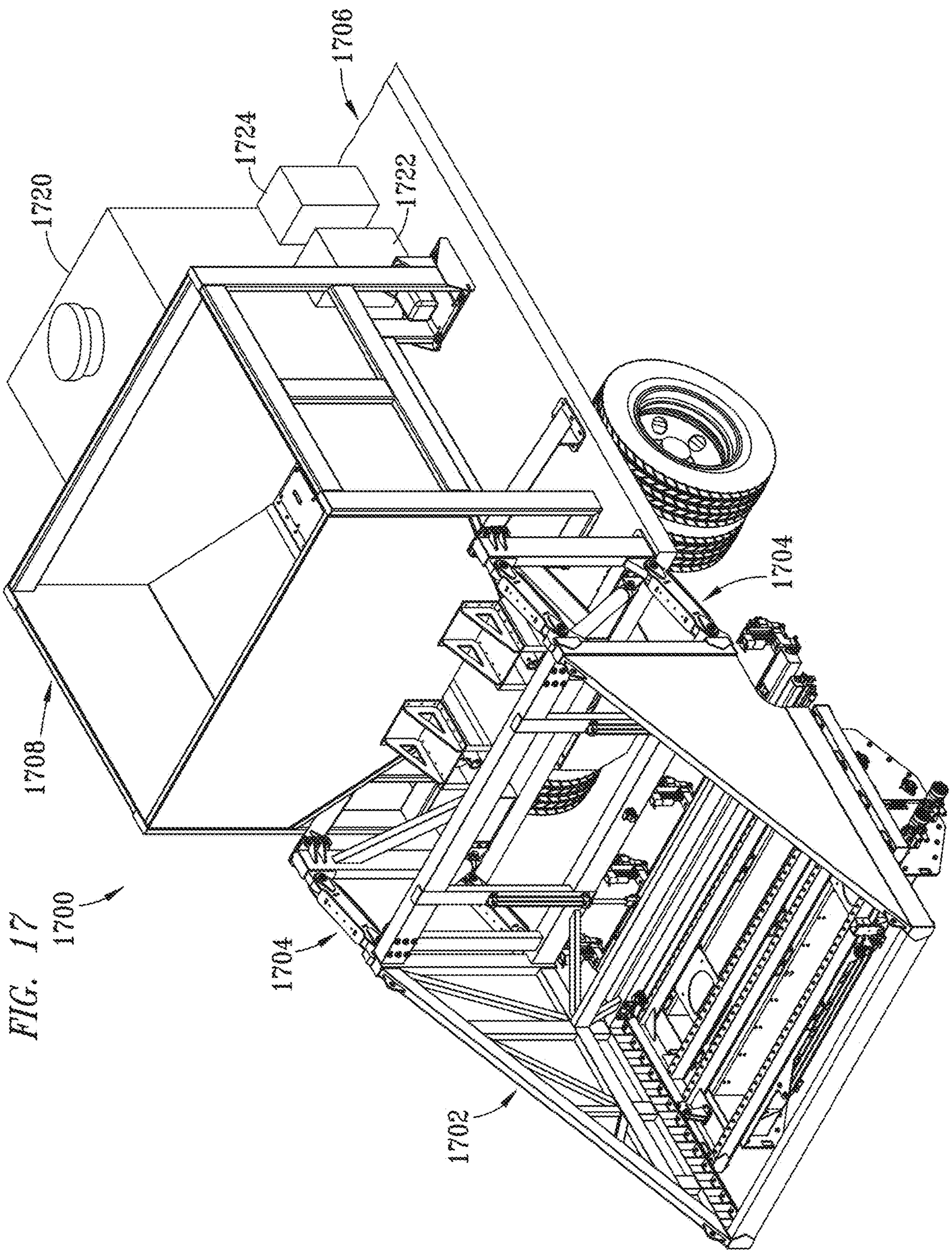
FIG. 17 is a perspective view of the invention according to an alternative embodiment of the invention.
Figure 18:
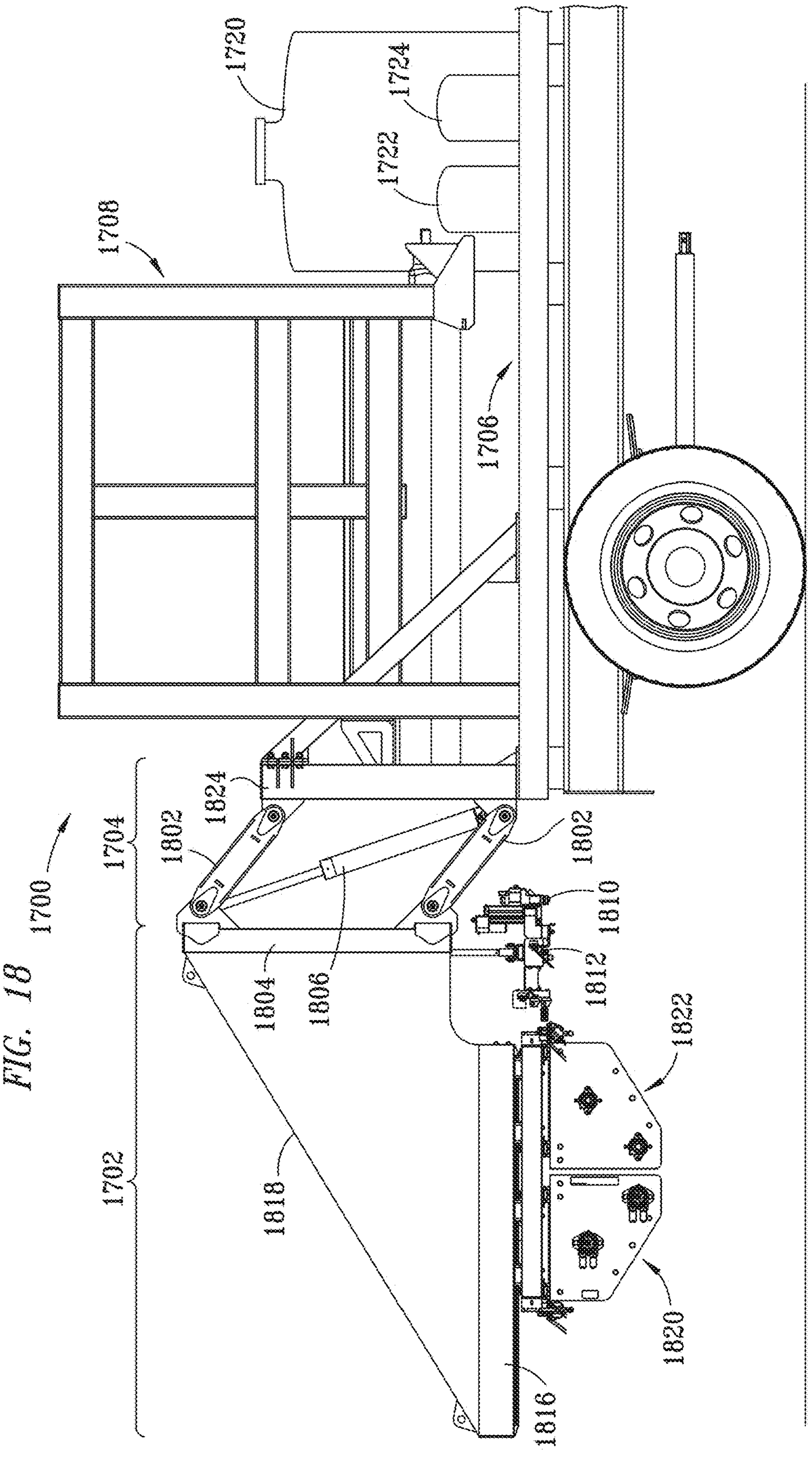
FIG. 18 is a side view of the invention of FIG. 17 with the dispenser assembly in a raised position.

In a fifth preferred embodiment of the binder applicator 118, depicted by FIGS. 14-16, the binder applicator is similar to the binder applicator of FIGS. 11-13, but for using slots 1402 and 1404 in place of circular openings 802 and 804. Optionally, zone partitions 410 (e.g., FIG. 4) may be utilized, and the applicator apron 404 is preferably attached to the binder applicator 118 as in the embodiments of FIGS. 4-13.

A bottom view of binder applicator 118 of FIG. 14 is shown in FIG. 15, and a partial view taken along section line 16 is shown in FIG. 16. As shown, the slots 1402 and 1404 are linearly arranged into two rows along the length of the binder applicator 118. Each slot 1402 is offset from a corresponding slot 1404, thus forming an overlap region 1406. The size and number of slots 1402 and 1404 are suitable for dispensing binder at a desired or optimal flow rate, and the overlap regions 806 are suitably sized to provide increased uniformity when binder is dispensed. In alternate embodiments, the number of rows of slots may vary, from a single row of slots to three or more rows of slots.

The slots 1402 and 1404 permit binder to be dispensed on the surface of the substrate in a substantially uniform manner similar to the slot 402 (FIGS. 5 and 8). But, because more structural material 1408 of the binder applicator 118 remains along the bottom of the applicator after forming the slots 1402 and 1404 than remains with slot 402 of the embodiments of FIGS. 5 and 8, there is more structural integrity to the binder applicator 118. As such, flanges 602 are preferably not used.

According to a preferred method and operation of binder applicator 118 of FIGS. 14-16, binder enters the binder applicator 118 via lines 116. Binder fills the cavity 405 and is then dispensed through slot 402 preferably onto the applicator apron 404. The applicator apron 404 further regulates the uniformity and thickness of binder, which is then dispensed onto the surface of the substrate 202.

Turning now to operation of the system of FIGS. 1-3, including the binder applicator 118 of FIGS. 4-16, and in accordance with principles of the present invention, binder is applied to the surface of the substrate 202 by the binder applicator 118. The binder applicator 118 preferably extends over the width of the mobile platform 100 in such a way as to produce a uniform coating across that width on the substrate 202. Flow to each of one or more binder zones (B-ZONE) of the binder applicator 118 may be adjusted or turned off, thereby enabling the overall width of the binder to be adjusted to the desired application width.

Within a short time after the binder is applied to the substrate, preferably less than five seconds, filler is added to the binder. The time lapse between the application of the filler and the application of the binder should be sufficiently short to ensure that the filler adequately penetrates the binder and good adhesion occurs. In the preferred embodiment of this invention, the filler is applied from hopper 122 through one to twenty zone flow controllers 120 (preferably four to twelve zone flow controllers are used) onto the binder at a rate of between about 0.5 and 45 kilograms per square meter (preferably between about 3.5 and 9 kilograms per square meter). The zone flow controllers 120 may comprise broadcast spreaders, drop spreaders, blowers, pumps, screws, conveyors, or other similar device. The filler is contained in a hopper 122 positioned on the mobile platform 100. The preferred filler is bauxite with a particle size in the range of between about 10 microns and 100,000 microns, and preferably between about 800 microns and 2,000 microns. The bauxite filler preferably flows by gravity, although mechanical conveyance can be used, through one or more flow control zone gates (not shown) on the bottom of the hopper 122, which meters the flow rate, onto a distributor 124 and finally onto the surface of the binder. Because the density of the bauxite is greater than that of the epoxy, it will tend to sink down into the epoxy. A sufficient quantity of filler is added to ensure that a portion of the filler is left protruding from the binder. As the epoxy hardens, it will bind to both the filler and the substrate, creating a strong, uniform coating.

In an alternate embodiment of this invention, a thermoplastic binder is used instead of an epoxy binder. In this embodiment, thermoplastic melting units are positioned on the mobile platform 100 which act to liquefy the plastic, making it pumpable. A pressurization and material metering device 108 is used as described herein to provide a means of material transfer and control. In this embodiment, static mixers are not used and the thermoplastic flows directly to the nozzles, where it is applied to the substrate.

In a further alternate embodiment of this invention, reflective material is mixed with the filler or added through a separate hopper, in close sequence with the addition of the filler, to the binder. The reflective material preferably comprises glass beads or other suitable material, which would help to increase the light reflectivity of the coating. This provides the additional benefit of making potentially hazardous areas more visible at night. Similarly, pigments or other colored fillers could be added to change the appearance of the coating.

In a still further alternate embodiment of this invention, the filler is added to the binder by blowing it onto the surface, using air conveyance. The filler is aspirated into an air stream and blown through one or more nozzles onto the binder surface. This process may have the added benefit of providing a greater downward force for the filler, resulting in greater binder penetration and adhesion.

In a still further alternate embodiment of the invention, the filler is applied to the binder by means of a conveyor or other such flow control devices used to move and meter solids. In this instance, the speed of the conveyor can be used to control the flow of filler and adjust the ratio of filler to binder.

In a still further alternate embodiment of this invention, more than one mobile platform 102 can be used to store, heat, meter, mix, and apply the binder and store, meter, and apply the filler. For example, the binder storage, metering, mixing, and application could be performed from one mobile platform, and the storage, metering, and application of the filler from another mobile platform. In this embodiment, a first mobile platform comprising the binder system would apply the binder to the substrate, and a second mobile platform comprising the filler would follow the first platform and would add the filler to the binder.

In a still further alternate embodiment of this invention, the applicator apron 404 may be supplemented by or replaced with a squeegee, and/or the like to further regulate binder uniformity and thickness.

Further embodiments 1700 of the invention are depicted by FIGS. 17-27, wherein an assembly 1702 is attached via a linkage assembly 1704 to a vehicle 1706, such as a truck. Vehicle 1706 preferably includes a flatbed having mounted thereon a bin 1708 for holding aggregate, at least one tote 1720 having a capacity of several hundred gallons of resin, a container 1722 for holding catalyst, a container 1724 for holding accelerant, and an air compressor 1726. Assembly 1702 includes a vertical structural member 1824, horizontal structural member 1816, and sidewall 1818. Assembly 1702 further includes polymer sprayers 1810 coupled for fluid communication to tote(s) 1720 and containers 1722 and 1724, air knives 1812 coupled for fluid communication to air compressor 1726, and aggregate dispensers 1820 and 1822 coupled for fluid communication to bin 1708.

Figure 19:
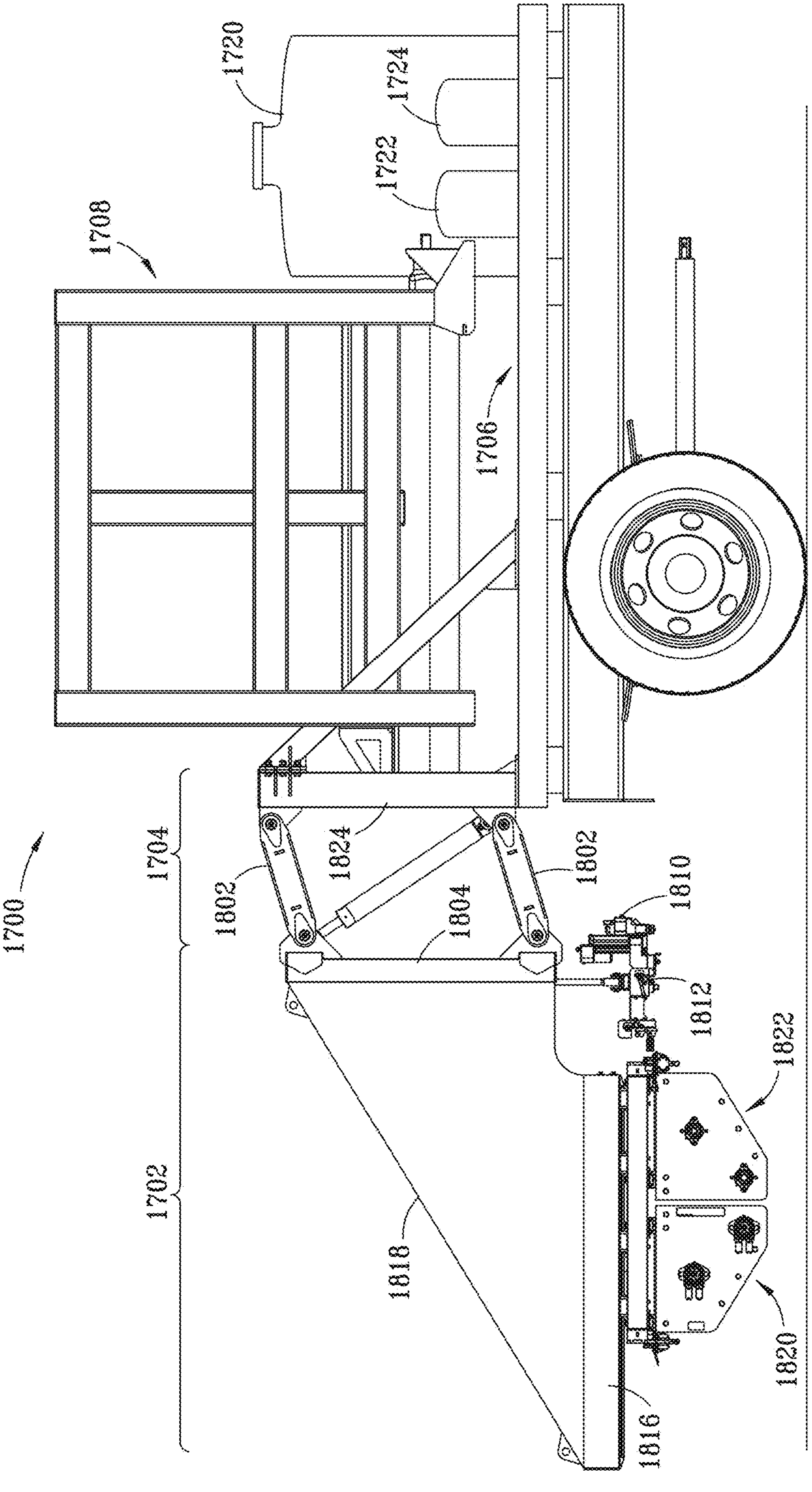
FIG. 19 is a side view of the invention of FIG. 17 with the dispenser assembly in a lowered position.

Linkage assembly 1704 is a parallelogram linkage assembly having vertical vehicle member 1804 secured to vehicle 1706. Two preferably parallel structural members 1802 couple ends of structural members 1804 and 1824 together. A hydraulic cylinder 1806 is coupled to opposing ends of structural members 1802 so that when the hydraulic cylinder is extended, the assembly 1702 is raised (FIG. 18, e.g., for travel), and when the hydraulic cylinder is retracted, the assembly 1702 is lowered (FIG. 19, e.g., for application). Two linkage assemblies 1704 are preferably provided for lowering and raising the assembly 1702. A feedback control system is preferably positioned for movement, preferably using a string potentiometer suitably positioned for measuring movement.

Figure 20:
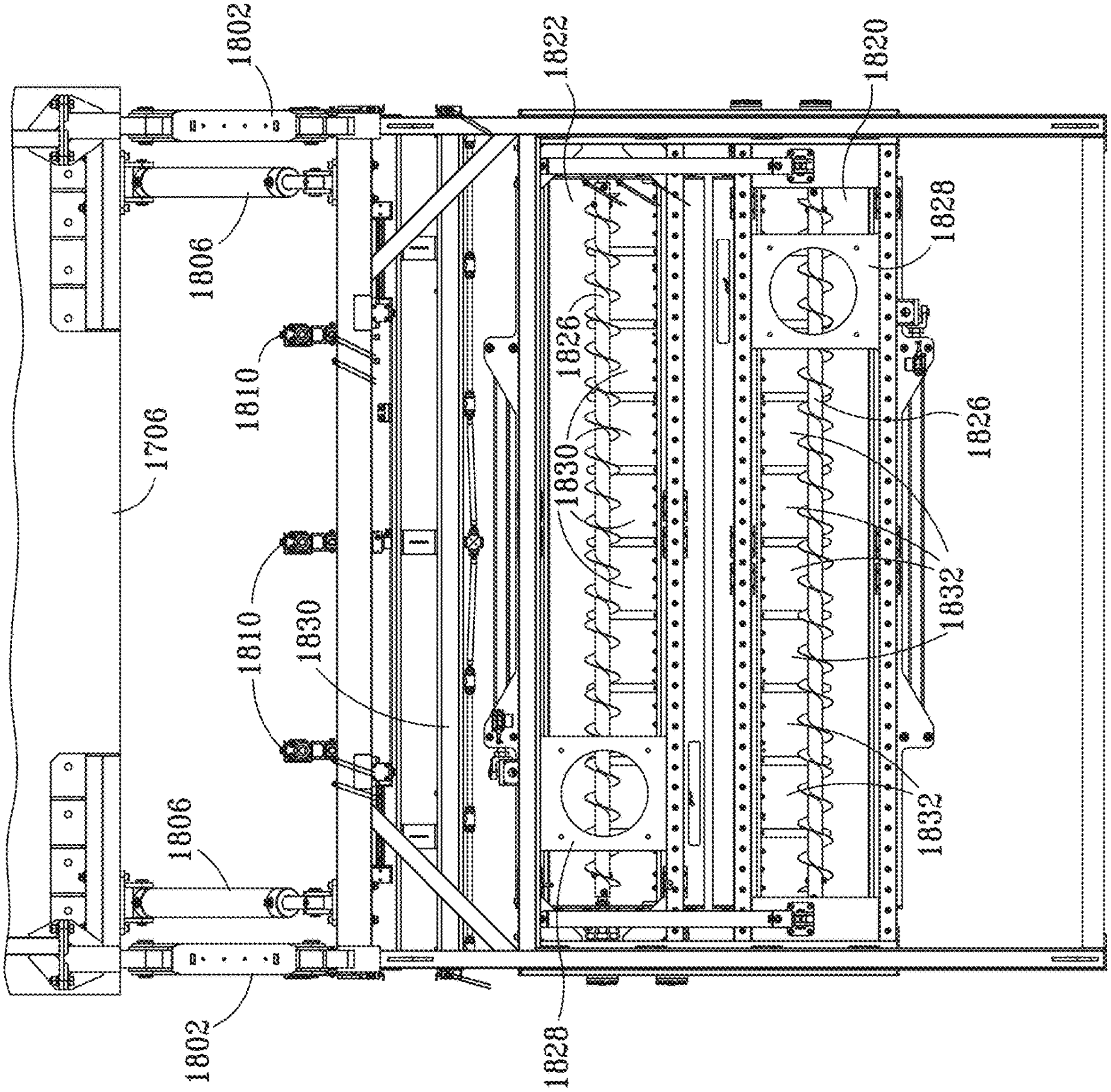
FIG. 20 is a top view of the invention of FIG. 17 with the dispenser assembly in a collapsed mode.
Figure 21:
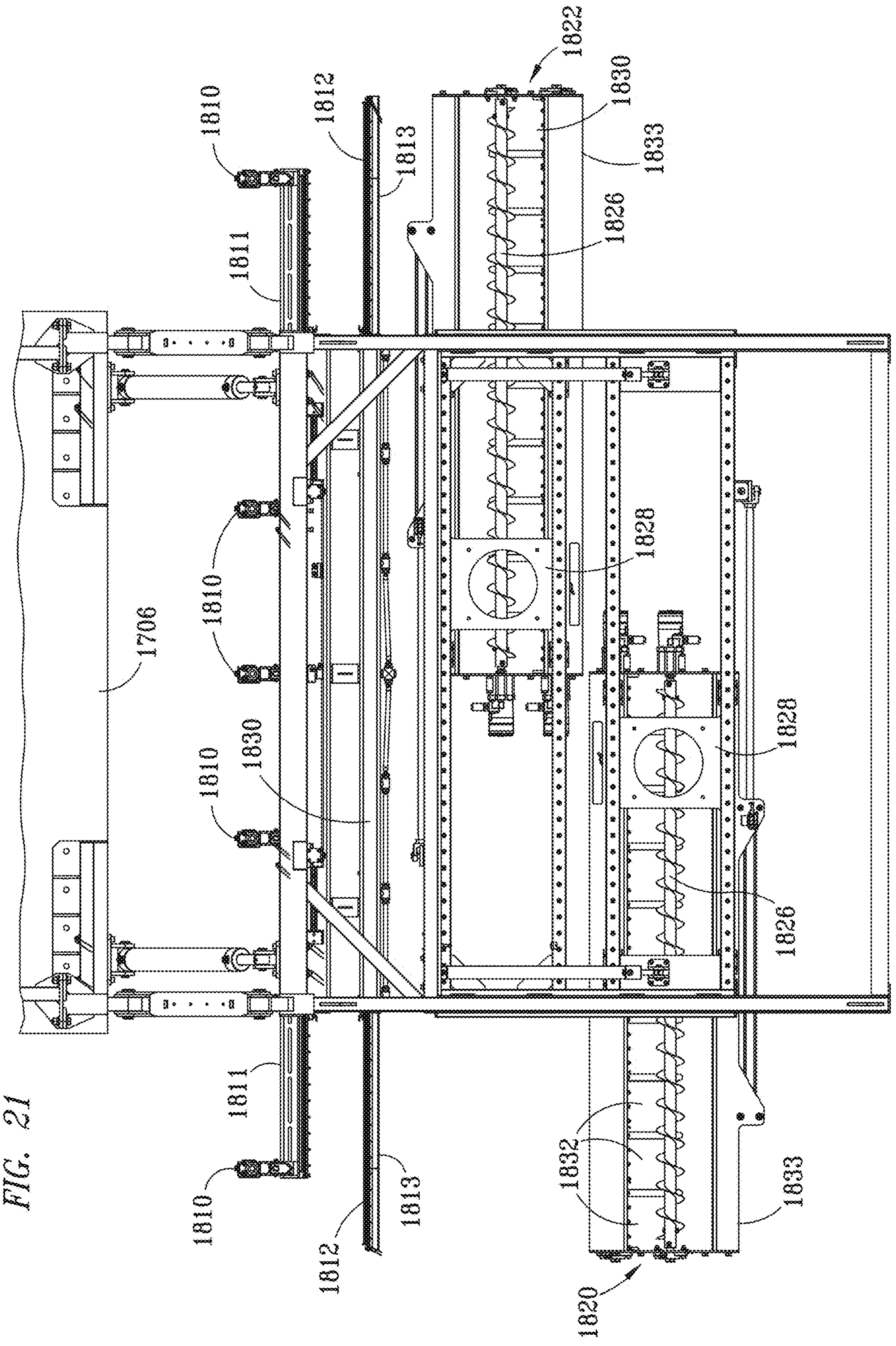
FIG. 21 is a top view of the invention of FIG. 17 with the dispenser assembly in an expanded mode.
Figure 23:
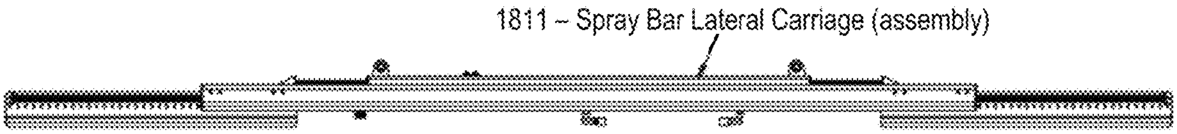
FIGS. 23-25 exemplify the spray bar.
Figure 24:
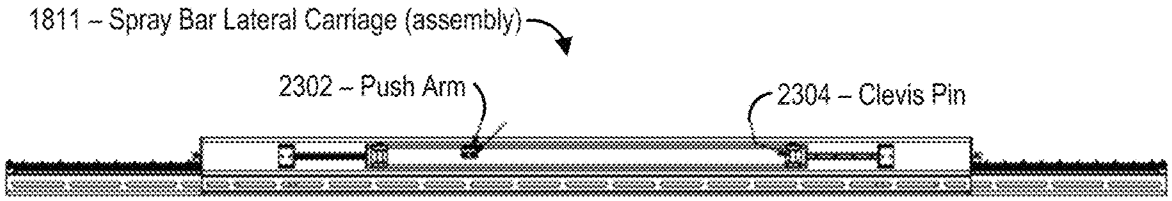
Figure 25:
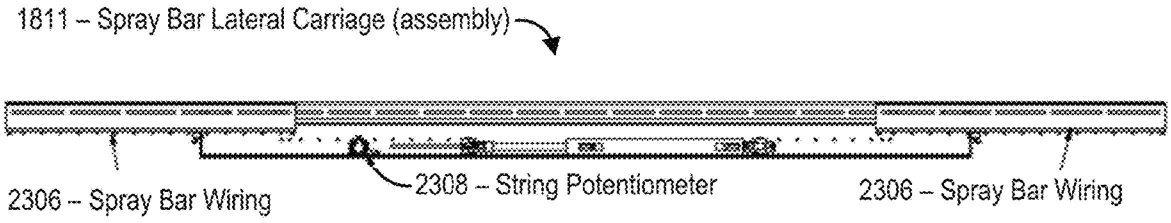
Figure 26:
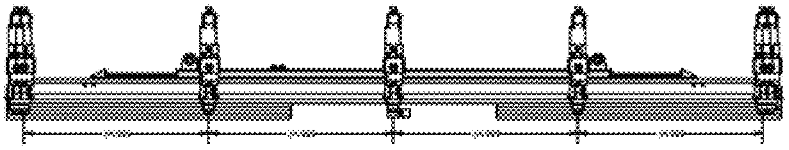
FIG. 26 exemplifies the spray bar fully retracted.
Figure 27:
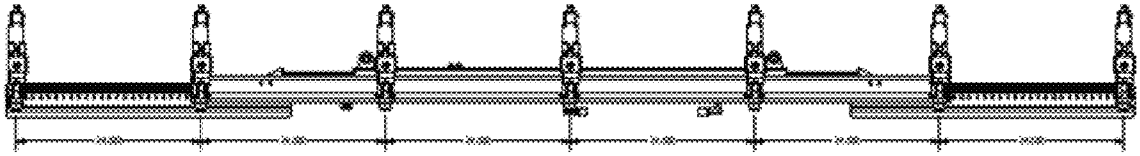
FIG. 27 exemplifies the spray bar fully extended.

As shown in FIGS. 20 and 21, the assembly 1702, and more specifically, binder applicator 1811, air knife bar 1813, and aggregate dispensers 1820 and 1822, may be laterally contracted and expanded, respectively, as single unit for accommodating various road widths. Expansion and contraction are preferably achieved using a hydraulic actuator and a carriage and rail linear bearing system. By way of example, but not limitation, the binder applicator 1811 is depicted in FIGS. 23-25, showing push arm 2302, clevis pin 2304, and wiring 2306, and in FIGS. 26 and 27 as retracted and extended, respectively. A feedback control system is preferably utilized to monitor lateral movement preferably using a string potentiometer such as depicted by reference numeral 2308.

The binder applicator 1811 and air knife bar 1813 can preferably be manually extended using a spring pull pin and slots. The extension wings preferably slide on linear rail and carriage systems. As best viewed in FIG. 21, the binder applicator 1811 preferably includes one or more spray nozzles 1810. The air knife bar 1813 comprises one or more air knives 1812, each of which air knives preferably defines a slit in a tube that extends across the length of the tube through which compressed air (from an air compressor mounted on the vehicle 1706) is ejected to create an air curtain for smoothing the polymer resin to prepare it for receiving aggregate from dispensers 1820 and 1822.

Figure 22:
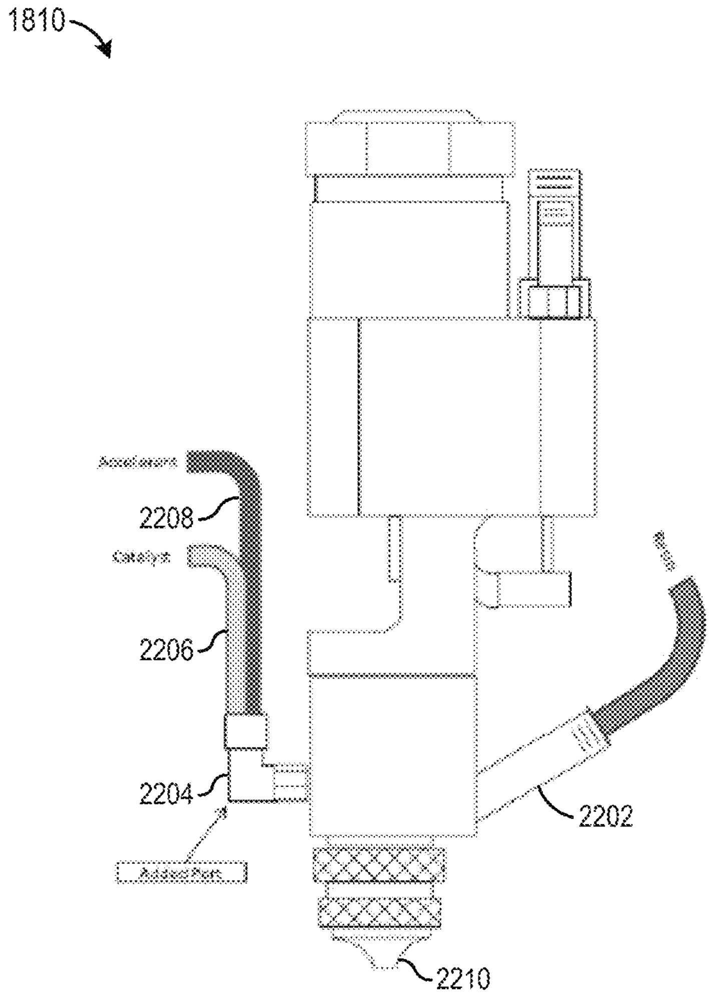
FIG. 22 exemplifies a nozzle used for spraying polymer.

FIG. 22 exemplifies a spray nozzle 1810. In one embodiment, the nozzle 1810 is a KML1000 paint spray gun with a port 2204 added to it. As depicted, resin (preferably a polyester polymer, or alternatively an epoxy polymer) enters the nozzle through inlet 2202, and catalyst 2206 and preferably an accelerant 2208 enter through the port 2204. The catalyst flows through the atomizing air ports of the gun and mixed at the tip. Each spray gun preferably has individual vertical adjustment with an electric actuator. Such actuators preferably have built-in feedback control. Each gun can also be individually laterally adjusted by loosening its mount bolt and sliding it in the slots on the main binder applicator 1811 body.

The air knives 1812 can be controlled by turning five sections on and off. The middle section is theoretically always on, and the outer sections can be turned on and off depending on the "target path width"; which in turn determines how many spray nozzles are active. Each section is preferably turned on or off using a valve. The pressure of the whole air knife system can be varied.

As shown in FIGS. 20 and 21, the aggregate bars 1820 and 1822 are configured to slide laterally on a rail and carriage system and are actuated using hydraulic actuators. There is preferably a feedback control system in place for this movement that preferably uses string potentiometers. The aggregate bars 1820 and 1822 preferably include gates which are opened and closed using individually controlled electric actuators. These actuators have built-in feedback control. The speed at which the aggregate is allowed out of the gates is controlled by the bottom screw.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An assembly comprising:

a mobile platform configured for being coupled to a vehicle;

a binder applicator mounted on the mobile platform and including an array of spray nozzles coupled to a container of resin;

an applicator apron attached to the binder applicator proximate to the array of spray nozzles;

an air knife bar mounted on the mobile platform and coupled to an air compressor for generating compressed air, wherein the air knife bar includes one or more air knives, each of which air knives includes a tube defining a slit in the tube extending substantially along the length of the tube and through which the compressed air is ejected; and an aggregate dispenser bar including at least one aggregate dispenser coupled to an aggregate bin and mounted on the mobile platform for dispensing aggregate via an extension and retraction assembly configured to extend and retract the binder applicator, the air knife bar and the aggregate dispenser bar.

2. The assembly of claim 1 wherein the binder applicator is fabricated from polyvinyl chloride.

3. The assembly of claim 1 wherein the applicator apron is fabricated from one of vinyl and flexible polyvinyl chloride.

4. The assembly of claim 1 wherein the mobile platform is configured for being coupled to a vehicle via a parallelogram linkage configured with a hydraulic actuator to raise and lower the mobile platform.

5. The assembly of claim 1 wherein the mobile platform is configured for being coupled to a vehicle via a parallelogram linkage configured with a hydraulic actuator to raise and lower the mobile platform and coupled to a bin containing aggregate for dispensing aggregate.

6. The assembly of claim 1 wherein the binder applicator includes a port inlet for catalyst.

7. The assembly of claim 1 wherein each of the spray nozzles includes a port inlet for catalyst.

8. The assembly of claim 1 wherein the binder applicator, applicator apron, air knife bar, and aggregate dispenser are configured to be extended and contracted as a single unit.

9. The assembly of claim 1 wherein the extendable binder applicator and the extendable air knife bar are configured to be manually extended.

10. An assembly comprising:

a mobile platform configured for being coupled to a vehicle;

a binder applicator defining a slit extending substantially across the length of the binder applicator, the binder applicator being mounted on the mobile platform and coupled to a container of resin;

an applicator apron attached to the binder applicator proximate to the slit;

an air knife bar mounted on the mobile platform and coupled to an air compressor for generating compressed air, the air knife bar including a tube defining a slit in the tube extending substantially along the length of the tube and through which the compressed air is ejected; and an aggregate dispenser bar including at least one aggregate dispenser coupled to an aggregate bin and mounted on the mobile platform for dispensing aggregate via an extension and retraction assembly configured to extend and retract the binder applicator, the air knife bar and the aggregate dispenser bar.

11. The assembly of claim 10 wherein the binder applicator is fabricated from polyvinyl chloride.

12. The assembly of claim 10 wherein the applicator apron is fabricated from one of vinyl and flexible polyvinyl chloride.

13. The assembly of claim 10 wherein the mobile platform is configured for being coupled to a vehicle via a parallelogram linkage configured with a hydraulic actuator to raise and lower the mobile platform.

14. The assembly of claim 10 wherein the binder applicator includes a port inlet for catalyst.

15. The assembly of claim 10 wherein the binder applicator, applicator apron, air knife bar, and aggregate dispenser are configured to be extended and contracted as a single unit.

16. The assembly of claim 10 wherein the extendable binder applicator and the extendable air knife bar are configured to be manually extended.

17. A method comprising steps of:

spraying resin through one or more spray nozzles onto a surface, the one or more spray nozzles being positioned on a binder applicator mounted on a mobile platform configured for being coupled to a vehicle;

smoothing the resin to prepare it for receiving aggregate by causing the resin to flow over an applicator apron and generating an air curtain over the resin by ejecting air through a slit defined in a tube constituting an air knife bar mounted on the mobile platform and coupled to an air compressor; and dispensing aggregate from at least one aggregate dispenser bar onto the smoothed resin, the at least one aggregate dispenser bar being coupled to an aggregate bin and mounted on the mobile platform, wherein the at least one aggregate dispenser bar is extendable and retractable.

18. The method of claim 17 wherein the resin is one of a polyester polymer and an epoxy polymer.

19. A method comprising steps of:

dispersing resin through a slit onto a surface, the slit being defined on a binder applicator mounted on a mobile platform configured for being coupled to a vehicle;

smoothing the resin to prepare it for receiving aggregate by causing the resin to flow over an applicator apron and generating an air curtain over the resin by ejecting air through a slit defined in a tube constituting an air knife bar mounted on the mobile platform and coupled to an air compressor; and dispensing aggregate from at least one aggregate dispenser bar onto the smoothed resin, the at least one aggregate dispenser bar being coupled to an aggregate bin and mounted on the mobile platform, wherein the at least one aggregate dispenser bar is extendable and retractable.

20. The method of claim 19 wherein the resin is one of a polyester polymer and an epoxy polymer.

* * * * *